United States Patent [19]
Leventis et al.

[11] Patent Number: 5,818,636
[45] Date of Patent: Oct. 6, 1998

[54] COMPLEMENTARY SURFACE CONFINED POLYMER ELECTROCHROMIC MATERIALS, SYSTEMS, AND METHODS OF FABRICATION THEREFOR

[75] Inventors: Nicholas Leventis; Young C. Chung, both of Somerville, Mass.

[73] Assignee: Molecular Displays, Inc., Cambridge, Md.

[21] Appl. No.: 480,078

[22] Filed: Jun. 7, 1995

Related U.S. Application Data

[60] Division of Ser. No. 42,029, Apr. 5, 1995, Pat. No. 5,457, 564, which is a continuation-in-part of Ser. No. 986,381, Dec. 7, 1992, which is a division of Ser. No. 485,379, Feb. 26, 1990, Pat. No. 5,189,549, and Ser. No. 717,892, Jun. 19, 1991.

[51] Int. Cl.⁶ ............................................. G02F 1/153
[52] U.S. Cl. ................................. 359/273; 359/275
[58] Field of Search ......................... 359/265, 273, 359/275, 277

[56] References Cited

U.S. PATENT DOCUMENTS

| | | | |
|---|---|---|---|
| 3,923,645 | 12/1975 | Anderson, Jr. et al. | 208/206 |
| 3,999,122 | 12/1976 | Winstel et al. | 324/71 SN |
| 4,018,508 | 4/1977 | McDermott et al. | 359/272 |
| 4,075,610 | 2/1978 | Crandall et al. | 265/107 |
| 4,361,497 | 11/1982 | Boldt et al. | 252/426 |
| 4,402,573 | 9/1983 | Jones | 300/307 |
| 4,435,048 | 3/1984 | Kamimori et al. | 350/357 |
| 4,439,039 | 3/1984 | Suovaniemi | 356/416 |
| 4,439,280 | 3/1984 | Gendler et al. | 204/2 |
| 4,442,422 | 4/1984 | Murata et al. | 338/35 |
| 4,444,892 | 4/1984 | Malmros | 436/528 |
| 4,459,035 | 7/1984 | Nanya et al. | 368/241 |
| 4,461,691 | 7/1984 | Frank | 204/242 |
| 4,473,695 | 9/1984 | Wrighton et al. | 546/266 |
| 4,475,036 | 10/1984 | Bauer et al. | 250/239 |
| 4,488,777 | 12/1984 | Bauer et al. | 350/279 |
| 4,498,739 | 2/1985 | Itaya et al. | 350/357 |
| 4,529,873 | 7/1985 | Ballmer et al. | 350/201 |
| 4,538,158 | 8/1985 | Warszawski | 346/136.1 |
| 4,557,978 | 12/1985 | Mason | 478/457 |
| 4,560,534 | 12/1985 | Kung et al. | 422/68 |

(List continued on next page.)

OTHER PUBLICATIONS

Electrochemical Oxidation and Reduction of Thin Films of Prussian Blue, Vernon D. Neff, J. Electrochem Soc., pp. 886–887, Jun. 1972.

Electrode for Electrochromic Display, L.D. Bowden and L.S. Chang, IBM Technical Disclosure Bulletin, vol. 19, No. 10, p. 3879 Mar. 1977.

Substrate for Transistor Array/Electrochromic Display Devices, S.P. Piggin, IBM Technical Disclosure Bulletin vol. 21, No. 1, p. 1978 Jun. 1978.

Color Projection Display System, J.G. Axford, IBM Technical Disclosure Bulletin, vol. 22, No. 2, p. 820.

(List continued on next page.)

*Primary Examiner*—Scott J. Sugarman
*Assistant Examiner*—Dawn-Marie Bey
*Attorney, Agent, or Firm*—Whitman Breed Abbott & Morgan LLP

[57] ABSTRACT

Electrochromic device having electrode surface confined complementary polymer electrochromic materials, and materials, systems and methods of fabrication therefore. The electrochromic devices employ a polypyrrole-prussian blue composite material on the oxiatively coloring electrode, and a heteroaromatic substance containing at least one quaternized nitrogen atom group on the reductively coloring electrode. A bilayer material consisting substantially of metallic oxide which is conductive in at least one of its redox states and electroplated with a polymer is also disclosed for use as an electrochromic material on either the oxidatively colored or reductively colored electrodes. A method for electrodeposition of viologen polymers at a substantially neutral pH is also disclosed. A method for self-powering and self-modulating electrochromic devices by means of photovoltaic cells is also disclosed.

22 Claims, 18 Drawing Sheets

U.S. PATENT DOCUMENTS

| | | | |
|---|---|---|---|
| 4,571,029 | 2/1986 | Skotheim et al. | 350/357 |
| 4,571,543 | 2/1986 | Raymond et al. | 324/425 |
| 4,594,834 | 6/1986 | Schmidt et al. | 53/117 |
| 4,596,635 | 6/1986 | Warszawski | 204/2 |
| 4,596,722 | 6/1986 | Warszawski | 427/108 |
| 4,644,344 | 2/1987 | Larsen et al. | 340/785 |
| 4,645,307 | 2/1987 | Miyamoto et al. | 350/357 |
| 4,652,090 | 3/1987 | Uchikawa et al. | 380/367 |
| 4,712,879 | 12/1987 | Uchikawa et al. | 330/387 |
| 4,715,690 | 12/1987 | Onodera et al. | 390/287 |
| 4,717,673 | 1/1988 | Wrighton et al. | 436/68 |
| 4,721,601 | 1/1988 | Wrighton et al. | 422/68 |
| 4,728,177 | 3/1988 | Green | 350/357 |
| 4,741,603 | 5/1988 | Miyagi et al. | 359/272 |
| 4,756,971 | 7/1988 | Virtanen et al. | 428/417 |
| 4,756,972 | 7/1988 | Kloosterboer et al. | 428/417 |
| 4,818,352 | 4/1989 | Inaba et al. | 204/59 R |
| 4,830,658 | 5/1989 | Bieringer et al. | 71/86 |
| 4,839,322 | 6/1989 | Yodice | 502/159 |
| 4,842,381 | 6/1989 | Green | 350/357 |
| 4,893,908 | 1/1990 | Wolf et al. | 359/275 |
| 4,902,108 | 2/1990 | Byker | 250/357 |
| 4,933,052 | 6/1990 | O'Brien | 204/58.5 |
| 4,933,053 | 6/1990 | Tieke | 284/598 |
| 4,940,315 | 7/1990 | Demiryont | 350/307 |
| 4,970,012 | 11/1990 | Kuroda | 282/62.2 |
| 4,973,391 | 11/1990 | Madou et al. | 204/78 |
| 5,002,700 | 3/1991 | Otagawa et al. | 252/500 |
| 5,011,944 | 4/1991 | Kvita et al. | 549/214 |
| 5,124,832 | 6/1992 | Greenberg et al. | 359/269 |

OTHER PUBLICATIONS

Direct View Color Display System, J.G. Axford, IBM Technical Disclosure Bulletin, vol. 22, No. 3, pp.1198–1199, Aug. 1979.

External Connection of a Liquid Film Intergrated Display, D.H. martin and W.M. Morgan, IBM Technical Disclosure Bulletin, vol. 23, No. 4, p. 1667, Sep. 1980.

Electrochromism in the Mixed–Valence Hexacyanides. 1. Voltammetic and Spectral Studies of the Oxidation and reduction of Thin Films of Prussian Blue, D. Ellis, M. Eckoff and V.D. Neil, J. Phys. Chem., pp. 1225–1231, 1981/Jan.

Forming Display Electrodes for Electrochromic Display, L. Barclay, IBM Technical Disclosure Bulletin, vol. 24, No. 1A, p. 223, Jun. 1981.

Spectrolectrochemistry and Electrochemical Preparation Method of Prussian Blue Modified Electrodes, Kingo Itaya, tatusuaki Ataka, and Shinobu Toshima, J. Am. Chem. Soc., p. 4767–4772, 1982/Feb.

Electrochromism in the Mixed–Valence Hexacyanides. 2. Kenetics of the Reductio of Ruthenium Purpose and Prussian blue, Kalnila P. Rajan and Vernon D. Neff, J. Phys. Chem., p. 4361–4368, 1982/Jul.

Chemical Derivatized Nickel Surface: Synthesis of a new Class of Stable Electrode Interfaces, Andrew B. Bocarsly and Sujit Sinha, J. Electroanal. Chem., p. 157–162, 1982/Mar.

Electrochemistry of Prussian Blue Modified Electrodes: An Electrochemical Preparation Method, Kingo Itaya, Haruo Akohoshi and Shinoby Tashima, J. Electrochem. Soc., pp. 1498–1500, Jul. 1982.

Fixing Image and Character Information in an Electrochromic Display, J.L. Bird and M. J. Szatkowski, IBM Technical Disclosure Bulletin, vol. 25, No. 11A, p. 5491, Apr. 1983.

Alkali Metal Cation Effects in a Prussian Blue Surface–Modified Electrode, Alvin L. Crumbliss, Paul S. Lugg and Nicholes Morosoff, Inorg, Chem., pp. 4701–4708, 1984/Feb.

Resistance Polyaniline Films as a Function of Electrochemical Potential and the Fabrication of Polyaniline–Based Microelectronic Devices, Elizabeth W. Paul, Antonio J. Ricco and Mark S. Wrighton, Journal of Physical Chemistry, vol. 89, No. 8, pp. 1441–1447, 1985/Oct.

Electrochromic Materials, Tetsu Oi, Ann. Rev. Mater, Sci. pp. 185–201, 1986/Jan.

Electrochemistry of Polynuclear Transition metal Cyanides: Prussian Blue and Its Analogues, Kingo Itaya and Isamu Uchida, Acc. Chem. Res., pp. 162–168, 1986/Apr.

Polypyrrole Film Electrodes Electrochemically Doped with Colloidal Prussian blue, O. Ikeda, J. Electroanal Chem., pp. 323–327, 1989/May.

Conductive Polymers, Mercouri G. Kanatzidis, G&EN, pp. 36–54, 1990/Dec.

Synthesis and Characterization of New Conducting Electropolymerized Film from 1–Maphtol, Minh Chou Pham, Jamal Moslish and Pierre–Cabille Locaze, J. Electrochem. Soc. vol. 138, No. 2, pp. 449–454, Feb. 1991.

Electrosynthesis, Spectroelectrochemical, Electrochemical, and Chronovoltabsorptometric Properties of Family of Poly (Aromatric Amines), Novel Processible Conducting Polymers, P. Chandrasekhar and Ronald W. Gimbs, J. Electrochem. Soc., vol. 138, No. 5, pp. 1337–1346, May 1991.

Raising the Voltage to Let in the Light, New York Times, Sep. 18, 1991.

Incorporation of Redox–Active Cations Into Tungsten Oxide Coatings on electrodes, Enhancement of Coating Stability and Electrocataytic Activity, Jean–Francois Roland and Fred C. Anson, Book of Abstracts, 203rd ACS National Meeting, Apr. 5–10, 1992.

Electrochromic system may have many uses, S. Stinson, Chemical and Engineering News, Apr. 20, 1992.

Bisensor Based on Conducting Polymers, D.T. hoa, T.N. Suresh Kumar, N.S. Punekar, R.S. Sprinivasa, R. Lal, and A.Q. Contractor, Anal. Chem. pp. 2545–2546, 1992/Jul.

Methylene Blue, Merck Index Date, 1949, Jan.

COMPLEMENTARY SURFACE CONFINED POLYMER ELECTROCHROMIC MATERIALS, SYSTEMS, AND METHODS OF FABRICATION THEREFOR

This application is a division of application Ser. No. 08/042,029, filed Apr. 5, 1995, now U.S. Pat. No. 5,457,564 which is a continuation in part of U.S. patent application Ser. No. 986,381, filed Dec. 7, 1992, which is a divisional of U.S. patent application Ser. No. 485,379, filed Feb. 26, 1990, now U.S. Pat. No. 5,189,549, granted Feb. 23, 1993, and U.S. patent application Ser. No. 717,892, filed Jun. 19, 1991.

FIELD OF THE INVENTION

The present invention relates to fabrication and characterization of both reflective and transmissive electrochromic devices, the electrochromic materials and electrolytes used, and a method to power these electrochromic devices with a photovoltaic cell. The latter method provides means for automatic modulation and self-adjustment of the color intensity of electrochromic devices in proportion to the ambient light conditions.

BACKGROUND OF THE INVENTION

Certain redox active materials display different colors in different oxidation states. This phenomenon is called electrochromism, and the materials are called electrochromic. Electrochromism has a potential application to light modulation including, for example, displays, mirrors of variable reflectance, sunglasses, automotive windshields, sunroofs, building windows and the like.

As disclosed in co-owned U.S. Pat. No. 5,189,549, the disclosure of which is incorporated herein by reference, it is desirable for an electrochromic device to include two electrochromic materials, with "complementary" electrochromic and electrochemical properties: That is, the first electrochromic material should undergo a colorless to colored transition oxidatively, while the second electrochromic material should undergo the same color transition reductively. Furthermore, the materials are electrochemically complementary so that one provides for a source and a sink of electrons within the same system, so that electrolytic decomposition of the solvent or the supporting electrolyte is prevented. In this way, one realizes double the optical effect per electron transferred, since two materials change color to a more highly colored (darker) state simultaneously. This "complementary counterelectrode" technology is, accordingly, the approach of choice.

Three distinct types of electrochromic devices are recognized in the art: (a) the solution type, (b) the precipitation type, and (c) the thin film or electrode surface confinement type.

In the solution type of electrochromic devices, the electrochromic materials are dissolved in the electrolyte and they move to the electrodes by diffusion. Faradaic current through the electrodes causes electrolysis of the electrochromic materials to their colored redox forms, which diffuse back into the electrolyte. The greatest advantage of the solution type of electrochromic devices is the variety of materials that can be used; every single redox active material which is electrochromic is a potential candidate. Three serious drawbacks, however, of this approach are: first, the speed of coloration of this type of electrochromic devices is relatively slow because it is controlled by diffusion in the bulk electrolyte; second, the color intensity depends on the concentration of the electrochromic materials, which, in turn, depends upon their solubility in the electrolytic solution; and third, faradaic (i.e, electrolytic) current has to be sustained continuously because the color bearing redox forms of the two electrochromic materials can either annihilate each other when they meet in the bulk solution, or they can be oxidized or reduced back to their colorless states at the opposite electrodes from the ones where they were formed. The latter drawback might become a significant problem in large area light modulation applications such as automatic windshields, automotive sunroofs, building windows, etc, because of the high energy consumption associated with it.

In the second type of electrochromic devices, the precipitation type, one redox form of at least one of the electrochromic materials is originally dissolved in the electrolyte, but upon oxidation or reduction, the "colored" product is plated onto the electrode. Typical examples of this are the reversible plating of silver, or the reversible plating in an aqueous electrolytic solution of a salt of the monocation radical of the one electron reduction product of N,N'-diheptyl-4,4'-bipyridinium dication. The precipitation type electrochromic devices are still rather slow because they are controlled by diffusion in the bulk electrolyte at least towards one of the redox directions, but reversible plating of at least one of the electrochromic materials onto the corresponding electrode decreases power requirements, and can be the basis of high resolution displays.

Finally, the thin film or electrode surface confinement type of electrochromic device, in principle, alleviates all the problems associated with the other two types of electrochromic devices. In theory, the electrode surface confinement of both electrochromic materials would provide the highest resolution possible, and hopefully, it would change the charging (switching) speed from diffusion controlled to charge transfer controlled. Moreover, physical separation of the two electrochromic materials would prevent annihilation of the colored forms, thus providing the so-called open circuit "memory effect" that would significantly decrease the average power consumption. In a sense, a surface confined type of electrochromic device can be considered as a rechargeable battery, in which the color of the electrode depends upon the state of charge.

Prior efforts have been made in use of surface confined electrochromic materials in electrochromic devices, primarily using certain metal oxides and conducting polymers. With respect to the metal oxides, the electrochromic effect displayed by $WO_3$ has attracted much interest. Reduction of $WO_3$ films on electrodes forms the so called tungsten bronzes which are blue and electrically conducting:

($M^+ = H^+$, $Li^+$, $Na^+$ etc.)

This reduction depends on the availability and uptake of both $M^+$ and $e^-$. Therefore, in aqueous electrolytes and at a fixed pH, $WO_3$ in the reduced state behaves as an electronic conductor below a certain potential threshold.

Despite the attention given metal oxides, such as $WO_3$, as electrochromic materials, metal oxides tend to switch slowly, and generally have a limited cycling lifetime.

Conventional electrode surface confined redox conducting polymers, such as polyaniline, polypyrrole, etc., are electrochromic, switch fast, and due to their flexible structure, can accommodate easily the volume changes induced upon oxidation and reduction, thus offering a potentially extended cycling lifetime. However, many conducting polymers, such as polyaniline, polypyrrole, polythiophene, etc. do not tend to absorb strongly in their colored states at a film thickness which retains fast switching speed and strong adhesion to the electrode surface.

In co-owned U.S. patent application Ser. No. 717,892, the disclosure of which is incorporated herein by reference, it is disclosed that the electrochromic effect of redox conducting polymers can be improved by incorporating in them other electrochromic materials such as prussian blue ($Fe_4[Fe(CN)_6]_3$). According to this method, a redox conducting polymer such as polyaniline, polypyrrole and poly(3-methyl) thiophene is electrodeposited onto an electrode. Such conducting polymer layers are then used as electrodes with accessible internal surface area, which is electrochemically plated with prussian blue from its precursors $K_3[Fe(CN)_6]$, and $FeCl_3$, creating a composite electrochromic material. Reduction of the resulting conducting polymer-prussian blue composites is chemically reversible, and gives a colorless film due to formation of the colorless Everitt's salt ($K_4Fe_4[Fe(CN)_6]_3$). Incorporating prussian blue into conducting polymers not only increases absorbance of the composite film in the oxidized state, but surprisingly, it also increases the cycling lifetime of prussian blue.

OBJECTS OF THE INVENTION

A first object of the present invention is to provide an electrochromic device with improved cycle lifetimes having at least one surface confined electrochromic material.

Another object is to provide an electrochromic device with improved switching speed having at least one surface confined electrochromic material.

Another object is to provide an electrochromic device of improved colorization contrast between the colored and uncolored state, having at least one surface confined electrochromic material.

Another object is to provide an electrochromic device having a stable and strongly adhered surface confined polymeric electrochromic material.

Another object is to provide a method for surface confining a polymeric electrochromic material in stable, strongly adhering, thick layers.

Another object is to provide an electrochromic device having at least one surface confined multilayer electrochromic material comprising a layer of an electrochromic metallic oxide surface deposited onto a conductive substrate with a layer of a polymeric electrochromic material deposited thereon.

Another object is to provide a method for making a surface confined multilayer electrochromic material comprising a layer of an electrochromic metallic oxide surface deposited onto a conductive substrate with a layer of a polymeric electrochromic material deposited thereon.

Another object is to provide a method to power an electrochromic device with a solar cell so that the electrochromic device-solar cell assembly is essentially self-powering and self-modulating as to the degree of colorization.

SUMMARY OF THE INVENTION

In accordance with a preferred embodiment of the present invention, an electrochromic device is provided comprising first and second electrode surface confined electrochromic materials in an ionically conductive solution, said first electrochromic material including a polymeric electrochromic material able to change from a substantially colorless state to a colored state upon reduction and said second electrochromic material including an electrochromic material able to change from a substantially colorless state to a colored state upon oxidation.

In a refinement of this embodiment, the polymeric electrochromic material able to change from a substantially colorless state to a colored state upon reduction is a heteroaromatic substance containing at least one quaternized nitrogen atom group. Examples of this are 4,4'-bipyridine, 2,2'-bipyridine, 4,9-diazafluorene and 3,7-diazafluorene.

In a further refinement of this embodiment, said heteroaromatic substance is a fused aromatic ring polyaromatic system.

In still a further refinement of the embodiment said fused aromatic ring polyaromatic system is taken from the group of 1,10-phenanthroline, 1,7-phenanthroline, 4,7-phenanthroline, 3,8-phenanthroline, 2,7-diazapyrene, and 2,9-diazaperopyrene.

In a further embodiment of this invention, said second electrochromic material is also polymeric.

In a refinement of this embodiment, said second polymeric electrochromic material is a derivative of thionin and its common derivatives such a methylene blue and methylene green, a derivative of oxazine, or a derivative of phenylphenazinium salts and alkylphenazinium salts.

In a further refinement of this embodiment said second polymeric electrochromic material is a redox conducting polymer taken from the group of polypyrrole, poly(N-methyl)pyrrole, poly (N-phenyl)pyrrole, poly N-[3-(trimethoxysilyl)propyl]pyrrole, polythiophene, poly(3-methyl)thiophene, polyazulene, polypyrene.

In a further refinement of this embodiment, the second electrochromic material includes a metal salt.

In still a further refinement of this embodiment, the second electrochromic material includes prussian blue.

In another preferred embodiment of the present invention, an electrochromic device is provided comprising a first electrochromic material consisting substantially of a composite material able to change from a substantially colorless state to a colored state upon oxidation including (a) an electrochromic metal salt and (b) a polymeric electrochromic material both able to change simultaneously from a substantially colorless state to a colored state upon oxidation, said first electrochromic material being surface confined on a substrate; a second electrochromic material including a polymeric electrochromic material able to change from a substantially colorless state to a colored state upon reduction, and being surface confined to a substrate and physically separated from said first electrochromic material; and an electrolyte ionically connecting but physically separating said first and second electrochromic materials.

In a refinement of this embodiment, the metal salt is prussian blue.

In a further refinement of this embodiment, polymeric electrochromic material able to change from a substantially colorless state to a colored sate upon oxidation, is taken from the group of polypyrrole, poly(N-methyl)pyrrole, poly(N-phenyl)pyrrole, poly N-[3-(trimethoxysilyl)propyl]pyrrole, polyaniline, polythiophene, poly(3-methyl)thiophene, polyazulene, and polypyrene.

In a further refinement of this embodiment, the polymeric electrochromic material able to change from a substantially colorless state to a colored state upon reduction is a heteroaromatic substance containing at least one quaternized nitrogen atom group.

In another embodiment of this invention, a method for surface confining a polymeric electrochromic material onto a conductive substrate is provided comprising the step of electrodepositing a polymeric electrochromic material onto said conductive substrate in an tonically conductive solution at a substantially neutral pH.

In a refinement of this embodiment, the pH is in the range of between about 5–9.

In a further refinement, the pH is in the range of about 7.

In a further refinement, the polymeric electrochromic material is a heteroaromatic substance containing at least one quaternized nitrogen atom group. Examples are 4,4'-bipyridine, 2,2'-bipyridine, 4,9-diazafluorene and 3,7-diazafluorene.

In a still further refinement, said heteroaromatic substance is a fused aromatic ring polyaromatic system.

In still a further refinement of this embodiment, said fused aromatic ring polyaromatic system is taken from the group of 1,10-phenanthroline, 1,7-phenanthroline, 4,7-phenanthroline, 3,8-phenanthroline, 2,7-diazapyrene, and 2,9-diazaperopyrene.

In another embodiment of the present invention, an electrochromic device is provided comprising a conductive substrate including a stable and strongly adhered, surface immobilized 4,4'-bipyridine derivative having a thickness of at least approximately 2,000 Angstroms.

In another embodiment of the present invention, an electrochromic device is provided comprising a substrate having a layer of a metallic oxide thereon, and a layer of strongly adhered, surface confined 4,4'-bipyridine derivative having a thickness of at least approximately 2,000 Angstroms.

In a refinement of this embodiment, the electrochromic metallic oxide is able to change from a substantially colorless state to a colored state upon reduction, and includes as a constituent a metal taken from the group of tungsten, molybdenum, niobium, vanadium and titanium.

In a refinement of this embodiment, the electrochromic metallic oxide is tungsten trioxide.

In another embodiment of the present invention, a method for surface confining electrochromic materials in multiple layers onto a conductive substrate is provided, comprising the steps of depositing a layer of an electrochromic metallic oxide which is conductive in at least one of its redox states onto said conductive substrate, and then electrodepositing a polymeric electrochromic material onto said metallic oxide layer in an ionically conductive solution.

In a refinement of this embodiment, the electrochromic metallic oxide is able to change from a substantially colorless state to a colored state upon reduction and includes as a constituent a metal taken from the group of tungsten, molybdenum, niobium, vanadium and titanium.

In a further refinement of this embodiment, the polymeric electrochromic material is a heteroaromatic substance containing at least one quaternized nitrogen atom group. Examples are 4,4'-bipyridine, 2,2'-bipyridine, 4,9-diazafluorene and 3,7-diazafluorene.

In a further refinement of this embodiment, said heteroaromatic substance is a fused aromatic ring polyaromatic system.

In still a further refinement of this embodiment, said fused aromatic ring polyaromatic system is taken from the group of 1,10-phenanthroline, 1,7-phenanthroline, 4,7-phenanthroline, 3,8-phenanthroline, 2,7-diazapyrene, and 2,9-diazaperopyrene.

In a further refinement of this embodiment, the ionically conductive solution is aqueous and adjusted to a pH in the range of about 5–9.

In a further refinement of this embodiment, the ionically conductive solution is adjusted to a pH in the range of about 7.

In another embodiment of this invention, a self-powering and self-adjusting electrochromic device is provided, comprising an at least partially transmissive electrochromic panel and a photovoltaic cell, said photovoltaic cell being arranged to be on the opposite side of said panel from the expected source of light and to face said expected source of light, said photovoltaic cell being electrically connected to said electrochromic panel in such a way that increased electrical output from said photovoltaic cell tends to increase the degree of coloration of said electrochromic panel, thereby tending to decrease the amount of light passing through said panel onto said photovoltaic cell.

BRIEF DESCRIPTION OF THE DRAWINGS

These objects, and others which will be apparent to those skilled in the art, are accomplished in accordance with preferred embodiments of the present invention wherein:

FIG. 3 is a Auger spectroscopic investigation of a Pt/PP-PB electrode. $\Gamma_{PP}$=0.34 mC/cm$^2$.

FIG. 4A represents the polypyrrole in 0.5M aq. K$_2$SO$_4$, $\Gamma_{PP}$=0.71 mC/cm$^2$, $\Gamma_{PP\text{-}PB}$=7.48 mC/cm$^2$, film thickness~3,000 Å; inset (a): anodic peak current vs. square root of scan speed; inset (b): relative cycling lifetimes of PP-PB vs. PB on Pt. FIG. 4B represents the polypyrrole in 1.0M NaClO$_4$/CH$_3$CN, $\Gamma_{PP}$=0.39 mC/cm$^2$, $\Gamma_{PP\text{-}PB}$=4.22 mC/cm$^2$. Inset shows anodic peak current vs. scan speed for the same electrode.

FIG. 5A represents the cyclic voltammetry, $\Gamma_{p\ (BPQ^{2+})}$=0.50 mC/cm$^2$; FIG. 5B represents the scan rate dependence of the first cathodic wave peak current, $\Gamma_{p\ (BPQ^{2+})}$=0.52 mC/cm$^2$.

FIG. 8A shows the device reverse biased at 0.9 V; Fig. 8B shows the device forward biased at 0.8 V.

FIG. 10A is for the transmissive device: $\Gamma_{PP-PB}$=6.09 mC/cm$^2$, $\Gamma_{p\ (BPQ^{2+})}$=1.64 mC/cm$^2$; the applied voltage was stepped from +0.8 V reverse bias, to 0.8 V forward bias.

FIG. 10B is for the reflective device: $\Gamma_{PP-PB}$=5.5 mC/CM$^2$, $\Gamma_{p\ (BPQ^{2+})}$=1.9 mC/cm$^2$; the applied voltage was stepped from 0.9 V reverse bias to 0.9 V forward bias.

FIG. 16A before the electrochromic device has become colored; and FIG. 16B after the electrochromic device has become colored.

FIG. 17A before the electrochromic device has become decolorized, and FIG. 17B after the electrochromic device has become decolorized due to the current through the photovoltaic cell;

DETAILED DESCRIPTION OF THE PREFERRED EMBODIMENTS

Figure 1:
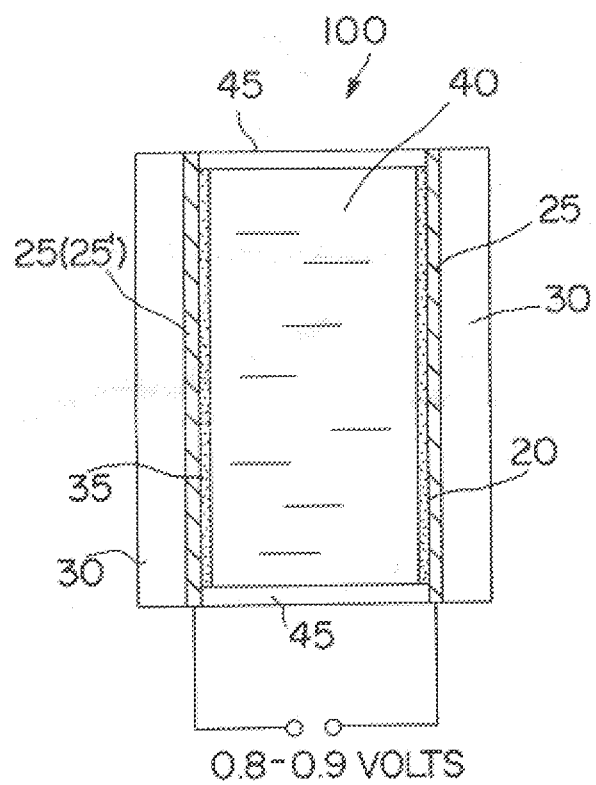
FIG. 1 is a schematic cross sectional view of an assembled electrochromic device employing a complementary electrochromic system in accordance with a preferred embodiment of the invention.

A. Description of electrochromic device having electrode surface confined complementary polymer polymer electrochromic materials Referring now to the drawings in detail, and initially to FIG. 1 thereof, an electrochromic device 100 with electrode surface confined complementary polymer electrochromic materials in accordance with one preferred embodiment of the invention is depicted.

An electrochromic material 20, able to change from a substantially colorless state to a colored state upon oxidation, is surface confined onto one of the electrodes 25, which is on a glass substrate 30. If the electrochromic device is transmissive, one of the electrodes, 25, is preferably a transparent electrode, such as a ITO coating. If the electrochromic device is to be reflective (i.e. a mirror), then one of the electrodes (25') if preferably a Pt coating.

The electrochromic material able to change from a substantially colorless state to a colored state upon oxidation, 20, and the electrochromic material able to change from a substantially colorless state to a colored state upon reduction, 35, are physically separate from one another but ionically connected by means of an electrolyte 40. The two glass substrates 30 are placed together, with gaskets 45 keeping the respective glass substrates 30, with their respective electrochromic materials, 20 and 35 apart.

The electrochromic material 35 able to change from a colorless state to a colored state upon reduction preferably is a viologen polymer derived through the reductive precipitation and cross-linking of N,N'-bis[p-(trimethoxysilyl)benzyl]-4,4'-bipyridinium dichloride:

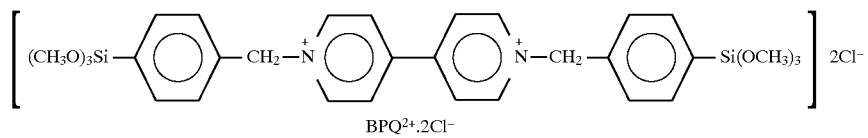

BPQ$^{2+}$.2Cl$^-$

In particular, polymers derived from N,N'-bis[p-(trimethoxysilyl)benzyl]-4,4'-bipyridinium dichloride and N,N'-bis [3-(trimethoxysilyl)propyl]-4,4'-bipyridinium dibromide are believed to be particularly advantageous as polymeric electrochromic materials able to change from a substantially colorless state to a colored state upon reduction. These polymers are referred to as Wrighton's viologen polymers and are described in U.S. Pat. No. 4,473,695.

Instead of a viologen polymer, other heteroaromatic substances containing at least one quaterized nitrogen atom group may also be employed. Preferably, the quaternized nitrogen atom group includes at least one trimethoxysilyl group for cross-linking. This improves the surface immobilization and adherence of the heteroaromatic material.

Analogues of Wrighton's viologen polymers described in U.S. Pat. No. 4,473,695 may be used in the present invention, where hydrogen atoms have been substituted for various groups (X, Y, W, Z, X', Y', W'Z') in the monomer

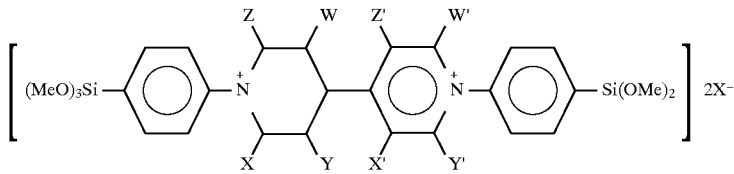

described in Wrighton's patent.

In addition, in this invention it is recognized that several other nitrogen containing heteroaromatic systems can be used beneficially. These include 2,2'-bipyridine derivatives:

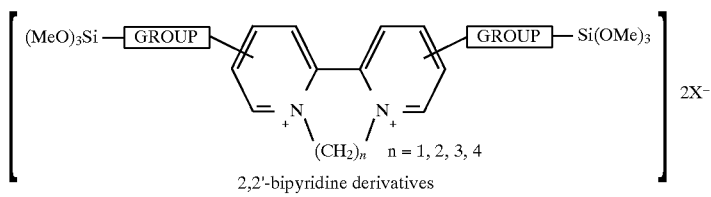

4,9-diazafluorene derivatives:

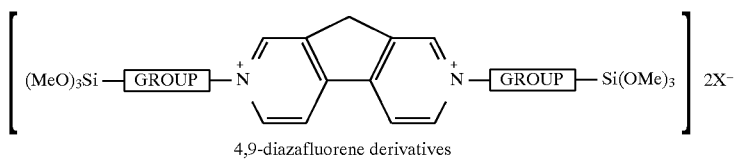

and 3,7-diazafluorene derivatives:

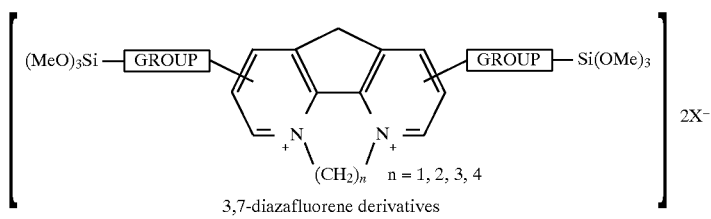

The following is a synthesis route for a 2,2'-bipyridine monomer, able to polymerize and electrode surface confined through the —Si(OMe)$_3$ functionality, and able to change from colorless to red upon reduction:

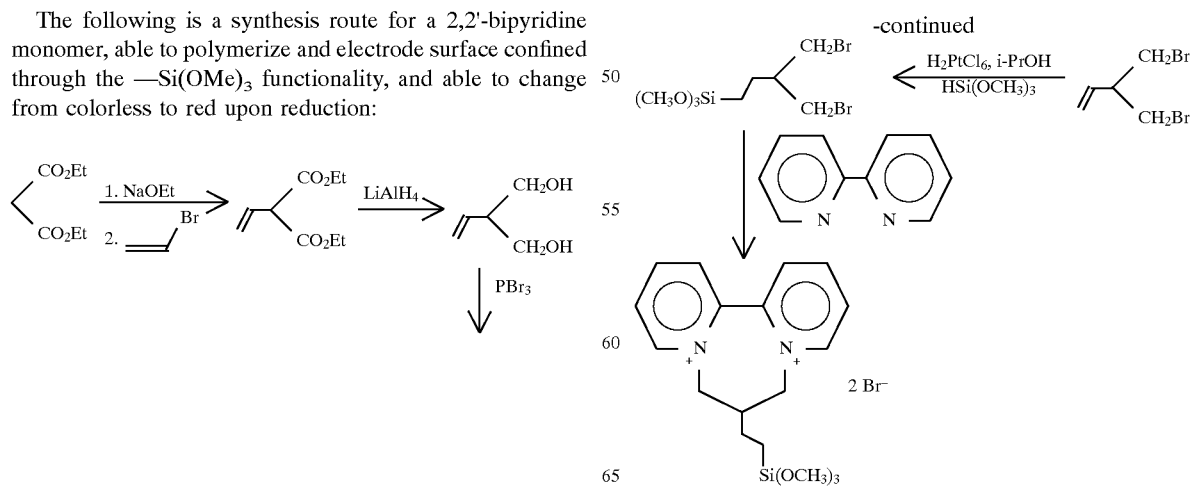

Moreover in this invention it is recognized that several fused aromatic ring polyaromatic systems can also be used beneficially. These include phenanthroline derivatives:

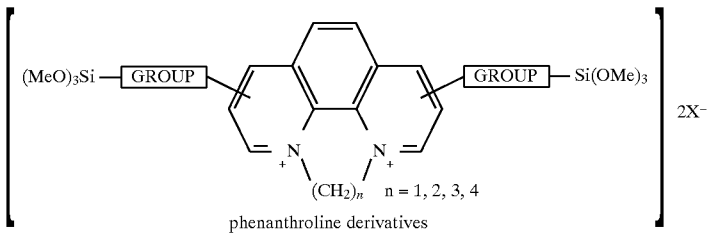
phenanthroline derivatives 2,7-diazapyrene derivatives:

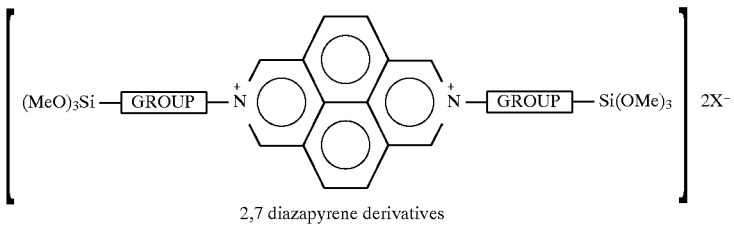
2,7 diazapyrene derivatives 2,9-diazaperoyrene derivatives:

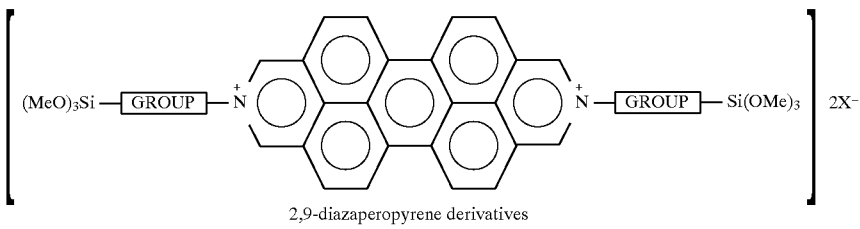
2,9-diazaperopyrene derivatives whereas,

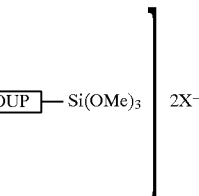:

is defined as an aromatic or aliphatic chain; (aromatic chains include but are not limited to benzyl, naphthyl, anthyl groups) and aliphatic chains include but are not limited to C2–C20 groups.) These polymers can also be used in place of p(BPQ$^{2+}$) in the metallic oxide/polymer layered material of one embodiment of the present invention (to be subsequently described).

The electrochromic material 20, able to change from a substantially colorless state to a colored state upon oxidation, preferably is a polypyrrole-prussian blue (PP-BB) composite such as is disclosed in U.S. patent application Ser. No. 717,892. This material, in addition to having similar desirable features as its polyaniline and poly(3-methyl)thiophene analogues, it is also very stable in aqueous electrolytes at neutral pHs. In lieu of the PP-PB composite, however, a metal salt alone, such as prussian blue may be employed, alone or composited with another oxidatively coloring polymeric electrochromic material able to change from a substantially colorless state to a colored state upon oxidation.

It is known that in solution, $Fe^{3+}$ and $[Fe(CN)_6]^{3-}$ form a one-to-one complex, $Fe^{III}-[Fe^{III}(CN)_6]$, which seems to be easily reducible at ca. +0.7 vs. SCE. Reduction of either that fericyanide complex, or of $Fe^{3+}$, have been deemed as important steps in the electrochemical plating of PB. Such PB films can be reversibly reduced to the colorless Everitt's salt according to:

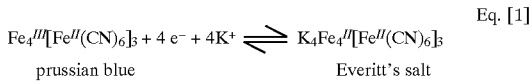

$$Fe_4^{III}[Fe^{II}(CN)_6]_3 + 4\,e^- + 4K^+ \rightleftharpoons K_4Fe_4^{II}[Fe^{II}(CN)_6]_3 \qquad \text{Eq. [1]}$$

prussian blue    Everitt's salt

Due to the high contrast associated with the foregoing redox reaction, PB films have been considered as appropriate for electrochromic and photoelectrochromic applications. Although the complementary electrochromic devices of the present invention can be built with prussian blue alone on the side that becomes colored oxidatively, poor cycling lifetimes of such PB films have been experienced.

As disclosed in U.S. patent application Ser. No. 717,892, the disclosure of which is incorporated herein by reference, if PB is impregnated into a polymer such as polyaniline, poly(3-methylthiophene) or polypyrrole, its cycling lifetime increases dramatically while its electrochromic effect remains unimpaired. Polypyrrole is preferred.

The reasons polypyrrole is advantageous are first, the resulting PP-PB composite is durable in aqueous solutions at neutral pHs. By contrast, polyaniline-PB composites, for example, are stable only in acidic pHs. Second, the PP-PB composite is almost colorless in the reduced state, whereas the poly(3-methyl)thiophene-PB composite, which is also stable at neutral pHs, is red in the reduced state. Therefore, it lacks the high contrast between the reduced and oxidized states of PP-PB.

In addition, for the electrochromic material 20, able to change from a substantially colorless state to a colored state upon oxidation, polymeric electrochromic materials alone may also be employed exclusively. The following three ring systems comprise the basis for well known dyes:

1.

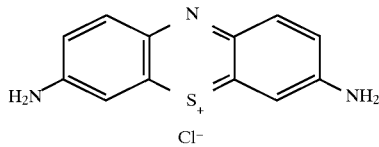

THIONIN and its derivatives . . .

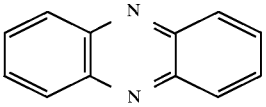

METHYLENE BLUE

-continued

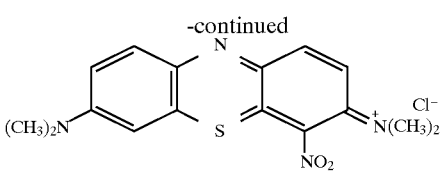

METHYLENE GREEN

2.

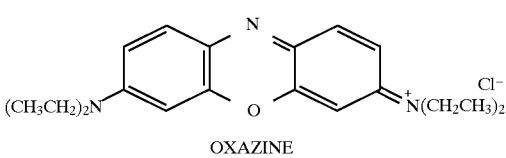

OXAZINE

3.

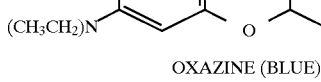

PHENAZINE

Importantly all these dyes are redox active and electrochromic, going reversibly from colorless to some color (see below) upon oxidation:

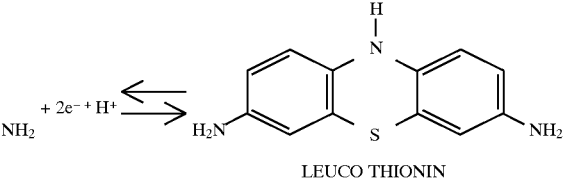

THIONIN (and its derivatives)    LEUCO THIONIN
BLUE                              COLORLESS

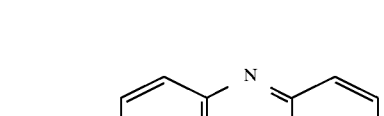

OXAZINE (BLUE)

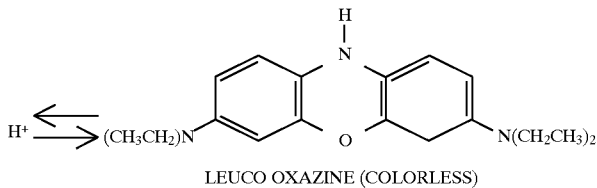

LEUCO OXAZINE (COLORLESS)

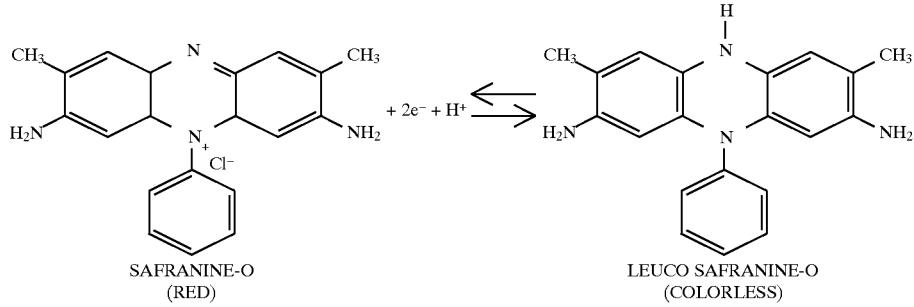

SAFRANINE-O (RED)   LEUCO SAFRANINE-O (COLORLESS)

It has been discovered that in aqueous solutions (pH ≦4.0), the oxidized colored form of all these dyes appears to be stable to sunlight indefinitely.

These materials are surface confined in a way similar to viologen, (or all the other reductively colored fused aromatic ring polyaromatic systems disclosed herein) if a trialkoxysilyl group is incorporated in the amine functionality that already exists in all these systems.

For instance, the following monomers are made from the thionin family of compounds:

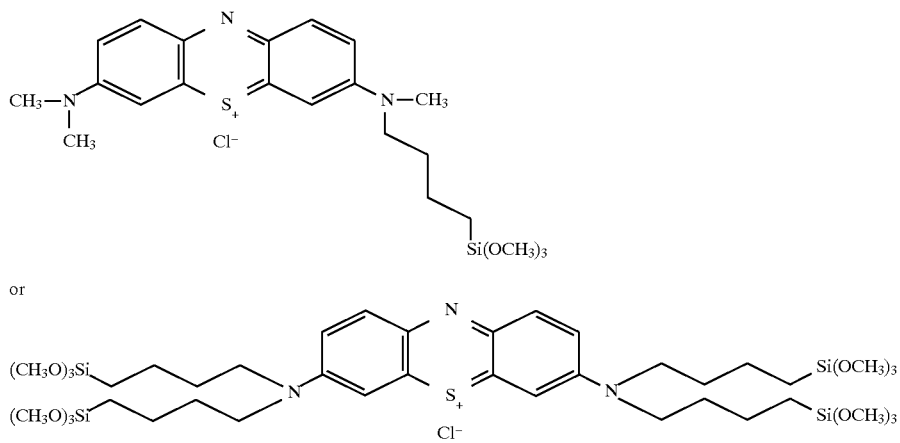

(BOTH ARE METHYLENE BLUE DERIVATIVE)

Similarly, the following monomer is made from the oxazine family:

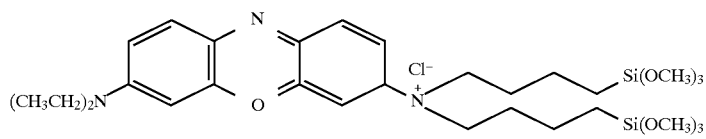

Finally, from the phenazine family the following safranine-O (that is a phenylphenazinium salt) monomeric derivative is deemed beneficial:

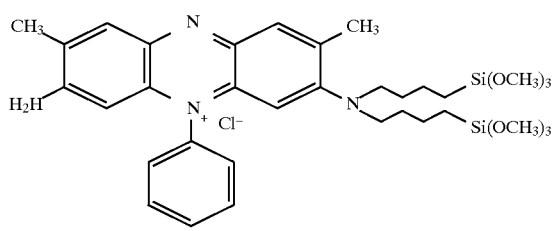

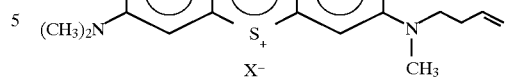

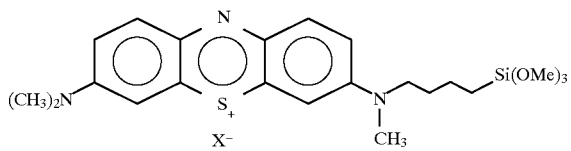

All the preceding monomers are polymerizable via the —SI(OMe)₃ functionality, yielding polymeric materials which become colored upon oxidation, and may be red on the oxidatively coloring side of the electrochromic device of the present invention.

These monomers can be synthesized by means of the following routes. For example, the methylene blue derivative can be synthesized by the following route:

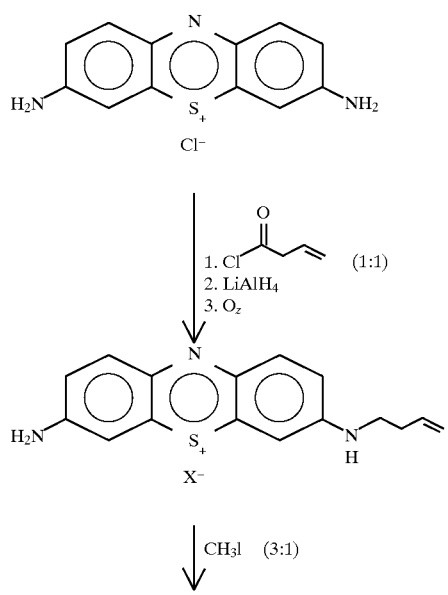

The other monomers can be synthesized in a similar manner.

A viscous aqueous solution of polyvinylpyrrolidone (PVP)/K₂SO₄ is preferably employed as the electrolyte 40. However, other electrolytes compatible with the electrochromic materials and substrates may also be employed.

Another viscous electrolyte is based on polyvinylalcohol. Both these electrolytes can be transformed to a gel by the addition of 0.5–1% (w/v) of carboxymethylcellulose. Another possibility is to use only carboxymethylcellulose which provides a gel-electrolyte. Below are listed in a table form various alternatives for electrolytes usable in the invention.

| THICKENING AGENT | TYPICAL SALT (SUPPORTING ELECTROLYTE) | PH-RANGE | ELECTROLYTE TYPE |
|---|---|---|---|
| AQUEOUS | | | |
| polyvinylpyrrolidone (~15%) | K₂SO₄ or KHSO₄ | 0.7–7 | viscous liquid |
| polyvinylalcohol (~20%) | K₂SO₄ or KHSO₄ | 0.7–7 | viscous liquid |
| polyvinylpyrrolidone-carboxymethylcellulose | K₂SO₄ or KHSO₄ | 3.5–7 | gel |
| polyvinylalcohol-carboxymethylcellulose | K₂SO₄ or KHSO₄ | 3.5–7 | gel |
| carboxymethylcellulose | K₂SO₄ or KHSO₄ | 3.5–7 | gel |
| polyvinylalcohol/H₃PO₄ | H₃PO₄ | 0–1 | solid |
| NON-AQUEOUS | | | |
| polyvinylpyrrolidone/ CH₃CN or CH₃(CH₂)₃CN | Li Triflate or NaClO₄ | | gel |
| polyvinylalcohol/CH₃CN or CH₃(CH₂)₃CN | Li Triflate or NaClO₄ | | gel |
| polyphosphazenes | Li Triflate | | gel |

One skilled in the art will recognize that many more electrolytes can be used and all of them fall within the scope of this invention.

The materials and methods of fabrication of preferred embodiments of the electrochromic device of the present invention are discussed in more detail below.

B. Example 1

Viologen and PP-PB Electrochromic Device a. Materials, techniques and equipment

Pyrrole, $K_3[Fe(CN)_6]$, $FeCl_3$, $K_2SO_4$, $K_2HPO_4$, $NaClO_4$ and anhydrous $CH_3CN$ were purchased from Aldrich. All aqueous solutions were made with deionized (DI) water of resistivity 17.8–18M ohm cm. N,N'-bis[p-(trimethoxysilyl)benzyl]-4,4'-bipyridinium dichloride ($BPQ^{2+}$) was prepared according to the literature. Platinum foils were obtained from AESAR, and cleaned in a freshly made $H_2O_2/H_2SO_4$ (1:4, v/v) solution, followed by flame treatment. ITO glass (maximum sheet resistance 5 Ω/sq.) was obtained from Metavac, Inc., Flushing, N.Y., and was cleaned with MICRO™ Cleaning Solution. If ITO glass was intended for $p(BPQ^{2+})$ electrodeposition, it was also treated with a c. KOH solution for ~1 min followed by washings with copious amounts of DI water. All electrochemical depositions and characterizations of the resulting films were done with a PINE RDE4 bipotentiostat. All solutions were Ar bubbling degassed, and all potentials were referenced vs. a Ag/AgCl reference electrode purchased from Bioanalytical Systems.

b. Deposition of PP-PB composite on the oxidatively colored side

Polypyrrole was electrodeposited from a 0.2M solution of pyrrole in 1.0M $NaClO_4/CH_3CN$, according to well established literature procedures. Polypyrrole, like polyaniline and poly(3-methylthiophene), is an insulator when reduced, and a fairly good conductor when oxidized above ~0.1 V vs. Ag/AgCl.

Prussian blue was electrodeposited in the polypyrrole film from a 0.5M aq. $K_2SO_4$ solution containing 5 mM each of $K_3[Fe(CN)_6]$ and $FeCl_3$, by cycling the potential of the polypyrrole covered electrodes from +0.6 C to +0.35 V at 50 mV/sec until the desired coverage was obtained. Apparently, either $Fe^{3+}$ and $[Fe(CN)_6]^{3-}$ independently, or the 1:1 neutral complex formed from these two PB precursors as mentioned above, diffuse inside the polypyrrole film and get reduced on the polymeric chains, which behave like effective microwires.

C. Deposition of $p(BPQ^{2+})$ on the reductively colored side

On the reductive side, a polymer of $BPQ^{2+}$, $p(BPQ^{2+})$, was electrodeposited onto Pt or ITO/glass electrodes by a novel departure from the literature procedure. The literature procedure detailed, for example, in U.S. Pat. No. 4,473,697, (Wrighton) teaches deposition of $BPQ^{2+}$ at a pH of ~10. In the present invention, instead of using this procedure, the electrode was cycled at 100 mV/sec between 0.0 V and −0.75 V in a ~5 mM solution of $BPQ^{2+}$ in 0.5M aq. $K_2SO_4$ adjusted at pH~7 with $K_2HPO_4$. It was determined that this viologen polymer can be deposited very effectively from neutral solutions.

d. Preparation of and characterization of electrolyte

The electrolyte was prepared by slowly dissolving, under boiling and vigorous stirring, 15 g of polyvinylpyrrolidone (PVP; av. mol. wt. 360,000; purchased from Sigma) in 150 ml of distilled water. After dissolution was complete, water was evaporated down to 100 ml, and $K_2SO_4$ was added so that $[K_2SO_4]$~0.2M. The viscosity of the electrolyte was measured with a Brookfield Digital Viscometer, Model RVTDV-II, equipped with a small sample adapter. Resistivity measurements of the electrolyte were done with the AC-impedance technique using a PAR 273 potentiostat and a PAR Model 4852 software system version 2.50.

e. Analysis techniques for electrochromic materials

Auger surface analysis was conducted, and SEM pictures were obtained with a Physical Electronics Industries Model 590A Scanning Auger Microprobe spectrometer (SAM). A 10 keV electron beam was used for excitation, and a cylindrical mirror analyzer (CMA) was used for detection. For depth profiling, sputtering was accomplished using a differentially-pumped argon ion gun generating a 2 keV, 40 $\mu A/cm^2$ $Ar^+$ beam. Samples for Auger were first characterized in both 0.5M aq. $K_2SO_4$, and in $CH_3CN$/1.0M $NaClO_4$; they were always disconnected from potential control at +0.5 V vs. Ag/AgCl, washed extensively with $CH_3CN$, $H_2O$, left in $CH_3CN$ for at least two hours, and subsequently vacuum dried. Brief surface sputtering of the samples prior to analysis to remove impurities, was accomplished using a 2 keV, 5.0 $nA/cm^2$ $Ar^+$ beam.

f. Assembly of the electrochromic device

Electrochromic transmissive devices were assembled using two 4"×4" ITO glass plates with a ¼" bus-bar along all four of their edges. Electrochromic reflective devices were assembled using 4"×4" glass plates sputtered with Cr/Pt, and one 4"×4" ITO/glass plate as above. An addressing wire was soldered on to one edge of each plate, and both the bus-bar and the soldered connection were insulated with epoxy.

Subsequently, PP-PB and $p(BPQ^{2+})$ were respectively electrodeposited on the respective plates, as described above. Next, a square viton gasket 45 (1/32" thick, obtained from Marco Rubber, North Andover, Mass.) was glued on top of the bus-bar, on the $p(BPQ^{2+})$ bearing plate (on the $p(BPQ^{2+})$/ITO side) and in such a way that when the plate is viewed from the plain glass side, the gasket is completely hidden by the bus-bar. Then, the shallow container formed by the gasket and the $p(BPQ^{2+})$ derivatized surface of the ITO glass plate, is filled with the electrolyte.

In the meantime, the PP-PB carrying plate is reduced electrochemically to the colorless state of the composite. At this point the electrolyte covered $p(BPQ^{2+})$ plate, and the decolorized PP-PB carrying plate, are brought together in such a way that no air bubbles are captured in the electrolyte; the excess electrolyte is wiped off the edges, and the devices are sealed with a layer of fast curing epoxy.

g. Discussion and analysis of electrochromic device

Spectroelectrochemical experiments were performed using a PC controlled Perkin Elmer lambda-6 dual beam UV-Vis. spectrophotometer. Assembled transmissive devices were placed directly in the light path of the first beam, while two sheets of ITO glass were placed in the path of the second beam. Spectroelectrochemical experiments of PP-PB or $p(BPQ^{2+})$ derivatized electrodes were carried out in an argon degassed and sealed H-cell.

Switching speed determination of the 4"×4" assembled reflective or transmissive devices was done with a potential step, while monitoring both the current, and the intensity of the reflected or the transmitted beam respectively, of a He-Ne laser, using a Si photodiode.

1. Analysis and discussion of the PP-PB composite film

Figure 2:
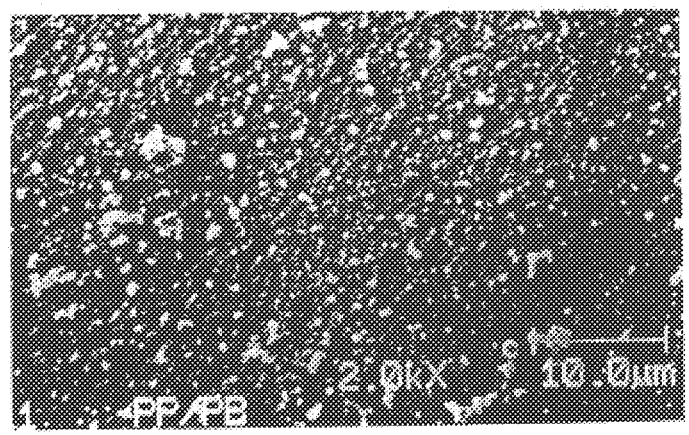
FIG. 2 is a scanning Electron Micrograph of a Pt electrode derivatized with polypyrrole-prussian blue composite (PP-PB). $\Gamma_{PP}$=0.81 mC/cm$^2$, $\Gamma_{PP\text{-}PB}$=3.34 mC/cm$^2$.

The SEM picture of the composite (FIG. 2) demonstrates a rather smooth layer, uniformly embedded with microgranules of PB.

Figure 3A:
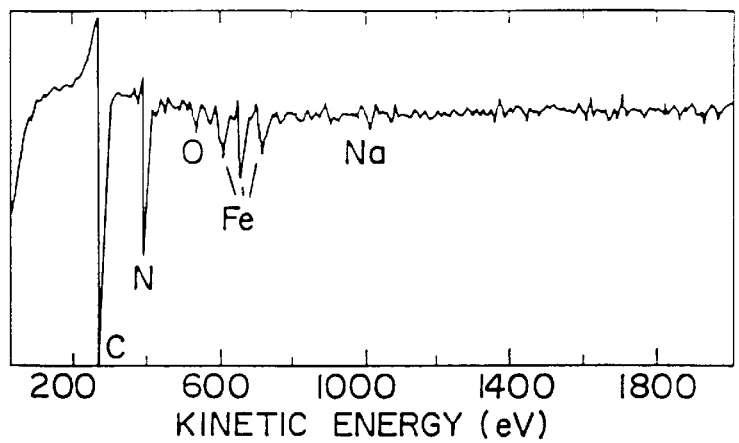
FIG. 3A is an initial survey spectrum of the clean PP-PB surface.
Figure 3B:
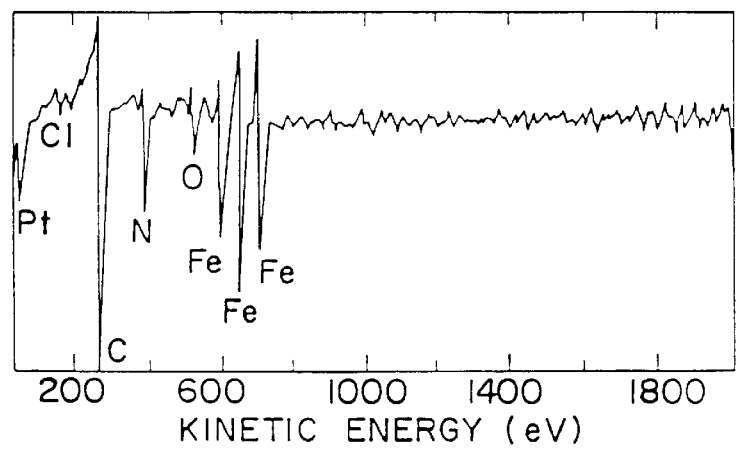
FIG. 3B is a survey spectrum taken during depth profiling after 0.7 min. of sputtering.
Figure 3C:
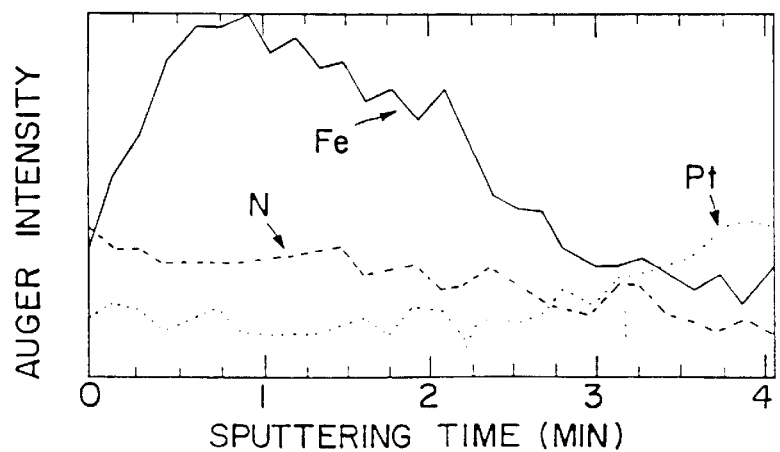
FIG. 3C is a depth profile; Auger signal intensity as a function of Ar$^+$ sputtering time.

Auger spectroscopic characterization of the PP-PB composite films (FIG. 3) verifies that prussian blue is distributed inside the polypyrrole layer, rather than segregated on the surface. As is apparent from the depth profile presented in FIG. 3C, the Fe signal from prussian blue maximizes below the surface of the composite, at a depth that probably reflects the mean diffusion distance of the prussian blue precursors before they get intercepted by the voltage sweep that causes their reduction to PB.

The PP-PB films for Auger analysis were first characterized by cyclic voltammetry in both 0.5M aq. $K_2SO_4$, and in 1.0M $NaClO_4/CH_3CN$ electrolytes successively, and they were always disconnected from potential control at 0.5 V vs. Ag/AgCl to ensure that PB is in the blue oxidized form. The fact that no residual potassium or sodium is seen in the Auger analysis of the composite (FIGS. 3A, and 3B) lets us conclude that prussian blue has been deposited in the so-called "insoluble form", that is $Fe_4[Fe(CN)_6]_3$, and upon reduction it uptakes reversibly $K^+$ or $Na^+$ and gets transformed to Everitt's salt or the Everitt's salt analog species $Na_2Fe''[Fe''(CN)_6]$ in non-aqueous electrolytes.

Figure 4A:
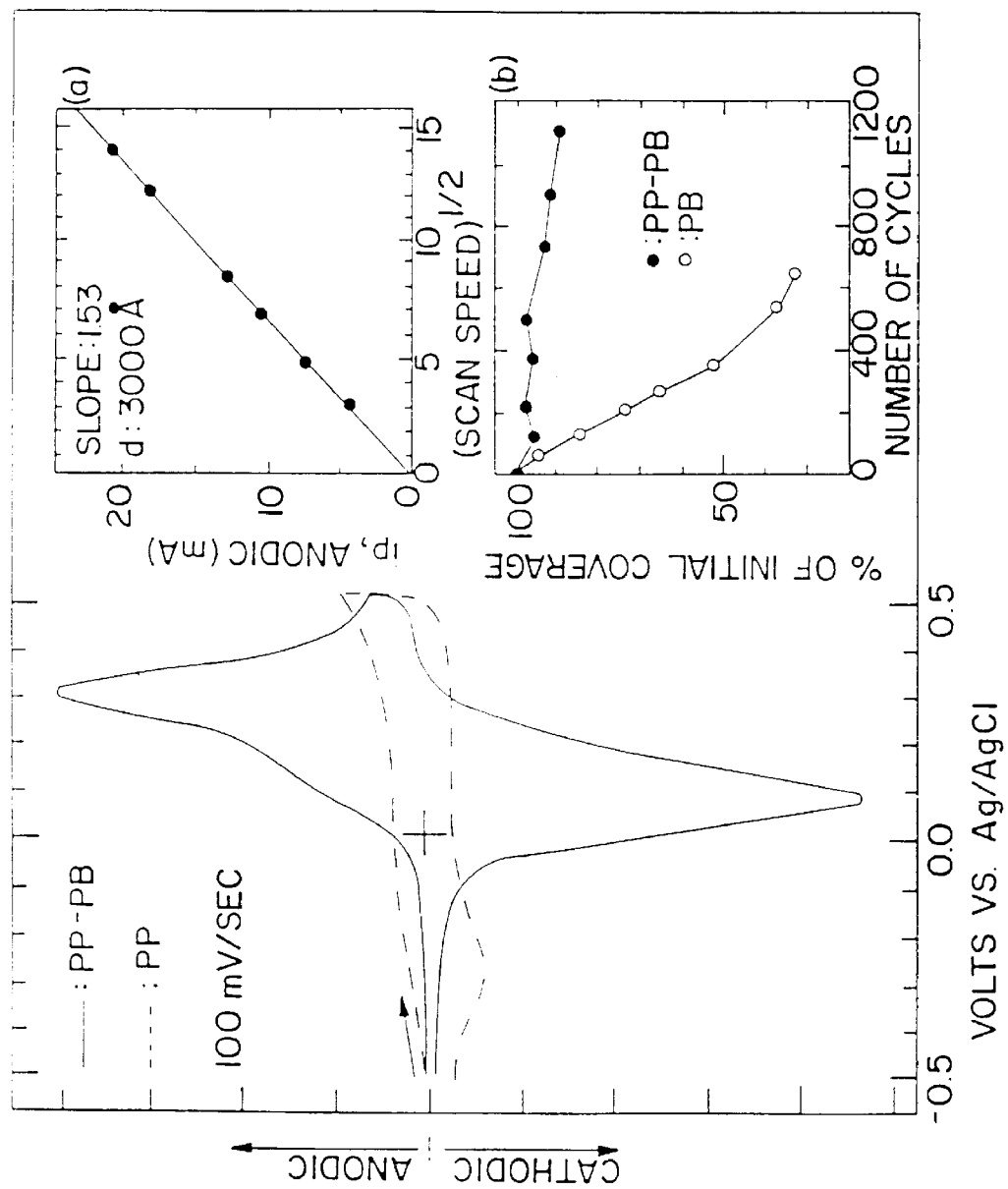
FIG. 4A and 4B are typical CVs of polypyrrole, before and after loading with prussian blue.
Figure 4B:
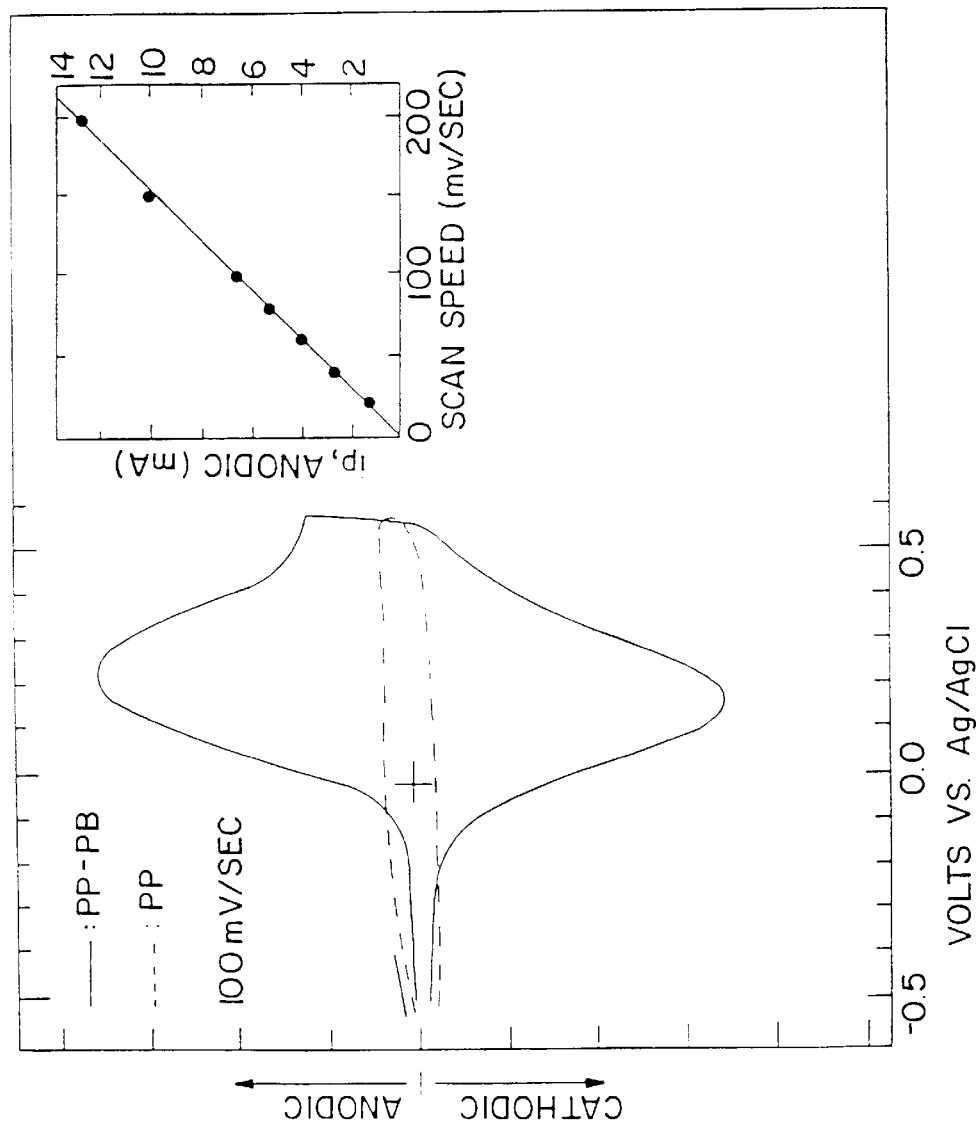

The cyclic voltammetric characterization of the PP-PB composite is shown in FIG. 4. As can be seen from inset (a) of FIG. 4A, oxidation of the PP-PB composite is diffusion controlled in the aqueous electrolyte, while the same oxidation in the $CH_3CN$ electrolyte is charge transfer controlled (see inset in FIG. 4B). This behavior follows the pattern of prussian blue film by itself, and is to be expected if the fact that the redox reaction of PP films is always charge transfer controlled is considered, so that prussian blue remains as the sole rate limiting factor.

From the slope of the line in inset (a), FIG. 4A, and the thickness of that particular PP-PB film, the diffusion coefficient for charge transfer ($D_{CT}$) in the PP-PB films in aq. $K^+$ electrolytes can be calculated using the Randles-Sevic equation. Knowledge of that DCT value allows one to reach certain conclusions regarding the switching speed of the complementary electrochromic prototype devices. For the process PP-ES→PP-PB, $D_{CT}$ in the PP-PB films is approximately $1.1\times10^{-10}$ cm$^2$/sec. This figure is about one order of magnitude smaller than the literature value for the process ES→PB in PB films in similar electrolytes.

Finally, inset (b) of FIG. 4A demonstrates that for similar coverages, prussian blue is more durable upon redox cycling in the polymer matrix than it is when directly deposited on the electrode by itself. The reason for this could be that some coordination of terminal Fe(III) of the PB lattice to the nitrogen sites of the polymer takes place, thus in effect, enhancing the adhesion of PB on the electrode. If this is the case, since the nitrogen electrons of polypyrrole do not participate in the conjugation responsible for conductivity, the benefits from the redox conducting properties of the polymeric backbone are not lost.

2. Analysis and discussion of the p(BPO$^{2+}$) films

The most well known non-metal oxide electrochromic material for reductive coloration has been methyl viologen (MV$^{2+}$:N,N'-dimethyl-4,4'-bipyridinium salts). The strong absorbance, and the exceptional stability in aqueous solutions of the blue radical, MV$^{·+}$, obtained from the one electron reduction of MV$^{2+}$, have been very attractive for electrochromic applications. Nevertheless, since both MV$^{2+}$, and MV$^{·+}$ are generally very soluble in both aqueous and common non-aqueous electrolytes, only solution type of electrochromic devices can be made with methyl viologen.

Early efforts to surface confine "viologens", that is diquaternized 4,4'-bipyridinium salts, include N,N'-diheptyl-4,4'-bipyridinium salts used in precipitation type of electrochromic devices as explained above. Another attempt to surface confine viologen included ionene polymers like:

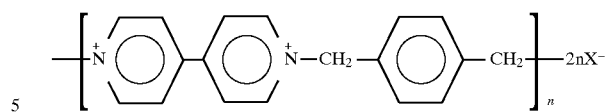

Unfortunately, these polymers do not have any means for anchoring on the electrode surface other than low solubility in the electrolyte employed, therefore they suffer short cycling lifetimes.

In one prior effort to increase the stability of such polymers on electrodes, they were co-deposited with poly(styrenesulfonate) to form an internal salt type of copolymer films.

A very successful method to confine viologen on electrode surfaces was developed by Wrighton and disclosed in U.S. Pat. No. 4,473,697. In this method, trimethoxyl silyl groups are incorporated into the basic viologen monomer. One such monomer is BPQ$^{2+}$, the structure of which was shown above.

BPQ$^{2+}$ has a built-in ability to cross link, thus becoming exceptionally insoluble, and secondly it has the ability to attach itself on the electrode surface through covalent bond formation via —O—Si—O— bridges.

BPQ$^{2+}$ was prepared according to the method of U.S. Pat. No. 4,473,697 and polymer films of BPQ$^{2+}$, here called p(BPQ$^{2+}$), were deposited on electrodes with the novel pH~7 method disclosed herein. During electrodeposition of the p(BPQ$^{2+}$), one electron reduction of BPQ$^{2+}$ produces the blue BPQ$^{·+}$ which precipitates on the electrode, and cross-links via hydrolysis of the —Si(OMe)$_3$ functionality.

It should be noted that BPQ$^{2+}$ monomer in aqueous K$_2$SO$_4$ of a concentration in the range of from 0.05 to 1.5M and a pH in the range of approximately 5 to 9 may also be employed in the invention. Also, in lieu of KH$_2$PO$_4$/K$_2$HPO$_4$ buffer, K$_2$SO$_4$, KCl, NaCl, may also be employed in the concentration and pH ranges specified.

Figure 5A:
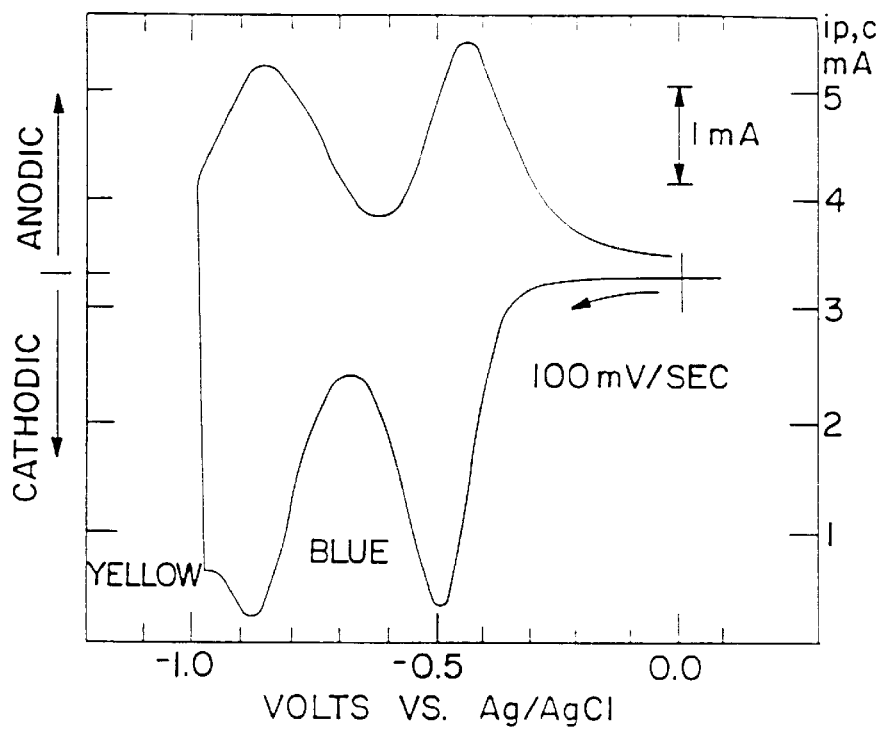
FIGS. 5A and 5B represent the electrochemical characterization of a viologen polymer film, here symbolized as p(BPQ$^{2+}$), on a Pt foil electrode (12.9 cm$^2$), in an Ar degassed 0.5M aq. K$_2$SO$_4$ solution.
Figure 5B:
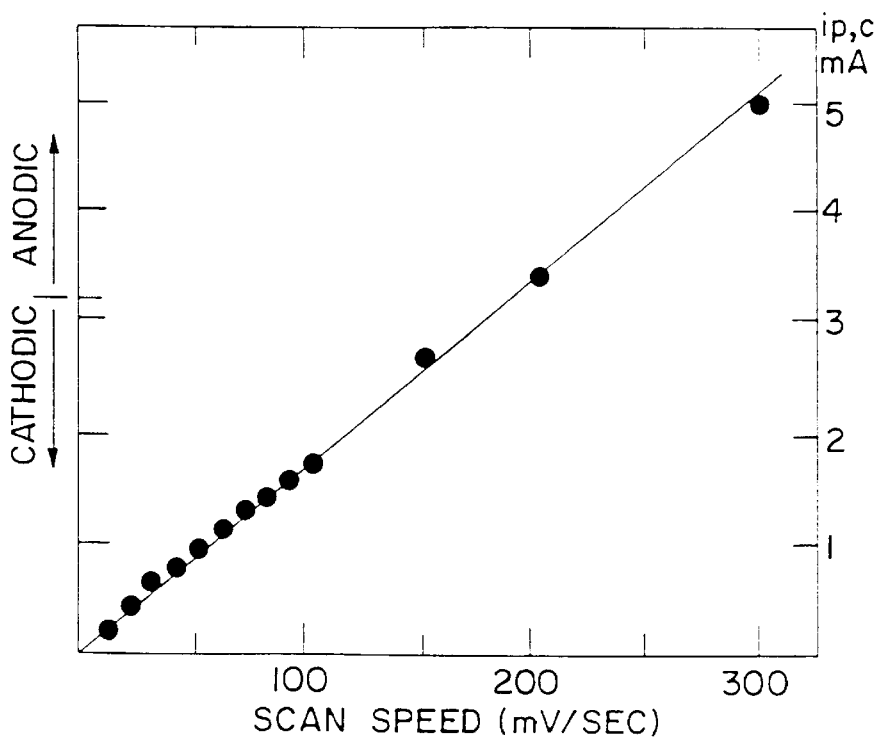

FIG. 5 shows a typical cyclic voltammogram of a p(BPQ$^{2+}$) film in 0.5M aq. K$_2$SO$_4$ solution. The first reduction wave gives the blue p(BPQ$^{·+}$) radical, while the second gives the neutral quinoid species which is yellow, and generally unstable in aqueous solutions. The first reduction wave is found to be charge transfer controlled in agreement with the literature. Importantly, the data indicates that the film is quite stable: it survived more than 400,000 cycles at 100 mV/sec with a 50% decrease in the charge under the CV. Even then, its visually perceived ability to modulate reflected light was only minimally impaired.

Figure 6:
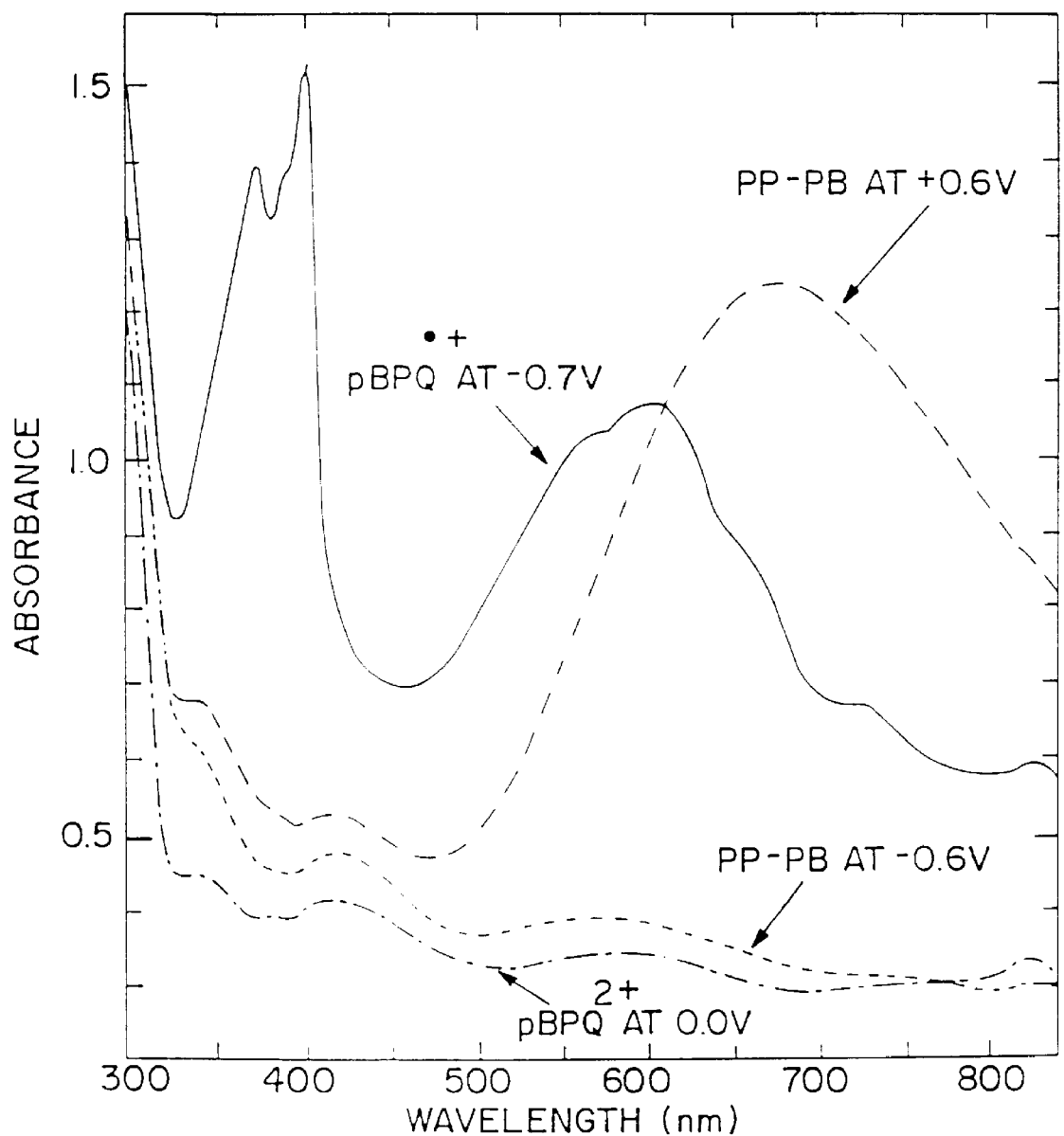
FIG. 6 represents the comparative spectroelectrochemistry of PP-PB and p(BPQ$^{2+}$) in 0.5M aq. K$_2$SO$_4$; $\Gamma_{PP\text{-}PB}$=6.95 mC/cm$^2$, film thickness~3,000 Å; $\Gamma_{p\ (BPQ^{2+})}$=1.86 mC/cm$^2$, film thickness~2,500 Å. Voltages shown are vs. the Ag/AgCl reference electrode.

FIG. 6 compares the absorption spectra of p(BPQ$^{2+}$) in the oxidized (dication), and the p(BPQ$^{·+}$) state in comparison to PP-PB composite in its respective oxidized and reduced states. A differential extinction coefficient ($\delta\epsilon_\lambda$) per unit coverage for both p(BPQ$^{2+}$) and PP-PB films can be calculated from the data of FIG. 6, by first finding the absorption difference ($\Delta A_\lambda$) for each film between its colored and colorless states, and then dividing $\Delta A_\lambda$ by the film coverage ($\delta\epsilon_\lambda=\Delta A_\lambda/\Gamma$). This way it is found that at the corresponding absorption maxima ($\lambda=\lambda_{max}$), p(BPQ$^{2+}$) modulates light with $\delta\epsilon_{608}$=0.360 cm$^2$/mC, obviously more efficiently than PP-PB, which modulates light with $\delta\epsilon_{667}$= 0.129 cm$^2$/mC efficiency.

Finally, from FIGS. 4A, 5 and 6 it is apparent that in order to force both p(BPQ$^{2+}$) and PP-PB in their blue colored states simultaneously, one has to apply a voltage larger than 0.6 V, but less than 1.3 V across them. If a voltage larger than 1.3 V were to be applied, p(BPQ$^{2+}$) would be forced into the unstable quinoid form, which should be avoided.

3. Discussion and analysis of the PVP-based electrolyte

A successful electrochromic system should be able to fit into a variety of applications with no modification of its chemistry. For the electrolyte then, desirable properties include non-toxicity, and a near neutral pH. On the other hand, practical considerations, such as sealing of the devices, dictate the use of viscous liquids (ideally gels) or solid electrolytes. The reason is that such an electrolyte is also a laminator, in effect "gluing" the two electrodes together.

In a preferred embodiment of the present invention, a 15% (w/v) solution of polyvinylpyrrolidone (PVP) in water, with 0.2M $K_2SO_4$ as supporting electrolyte was used. This is a very viscous non thixotropic liquid that, interestingly, behaves as a near newtonian fluid. At room temperature, the absolute viscosity of the electrolyte varies from 1500 cp at 10 rpm, to 1340 cp at 100 rpm (the absolute viscosity of water is 1.0 cp). The supporting electrolyte must contain potassium which is needed for the reduction of prussian blue. Pure PVP is non-toxic, chemically stable, and is found to be electrochemically inert.

Figure 7A:
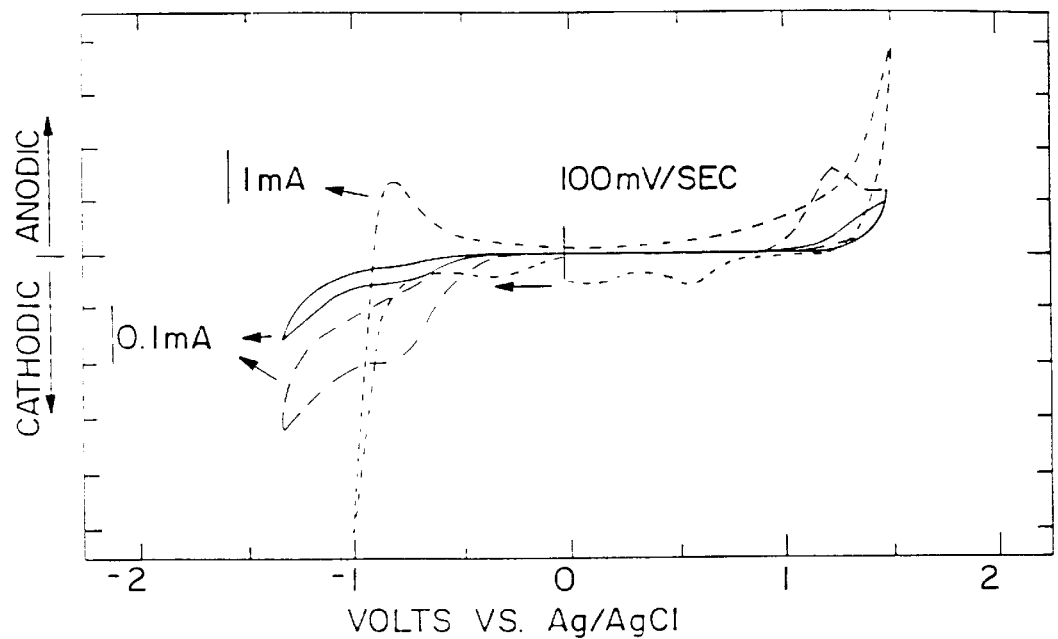
FIG. 7A represents the CVs of a Pt (Bcm$^2$) and a ITO (3.4 cm$^2$) electrode in 15% (w/v)PVP, 0.2M aq. K$_2$SO$_4$ electrolyte (dotted line and solid line respectively). The dashed line corresponds to the same ITO electrode in 0.5M aq. K$_2$SO$_4$ electrolyte. (PVP=Polyvinylpyrrolidone)
Figure 7B:
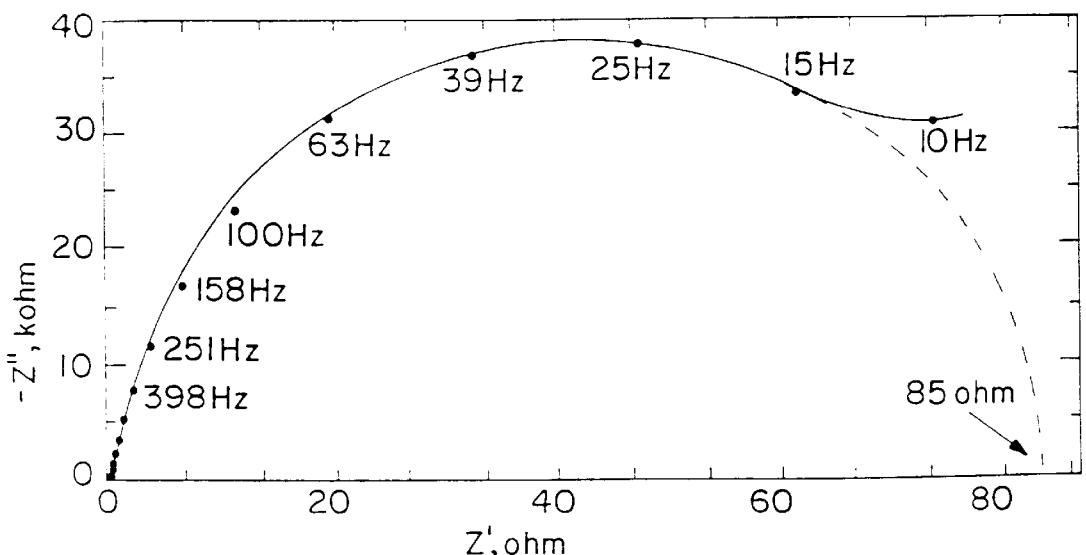
FIG. 7B represents the Nyquist plot of a Pt electrode cell (surface area=5.29 cm$^2$; thickness=0.0125 cm) filled with the same electrolyte.

FIG. 7A demonstrates the potential window available to Pt or ITO electrodes in the PVP electrolyte. FIGS. 7B, in turn, demonstrates the AC-impedance response of a cell made of ~1"×1" glass/Cr/Pt electrodes, and filled with the PVP based electrolyte. It is found then that in R.T. the resistivity of the PVP based electrolyte is ~36×10³ Ω-cm, while the literature value of the resistivity of the corresponding 0.2M aq. $K_2SO_4$ electrolyte is 28.8 Ω-cm at 20° C. The great difference in resistivity of the 0.2M aq. $K_2SO_4$ electrolyte with or without PVP, is directly related to the much higher viscosity of the PVP electrolyte. The following equation $$\rho = \left[ F \sum_i \frac{Z_i^2 e C_i}{6\pi r_i} \right]^{-1} \times \eta$$

demonstrates the proportional relationship between the ionic resistivity (ρ) and the viscosity (η) of an electrolyte. According the the foregoing equation the AC-impedance resistivity measurements appear internally consistent with the viscosity data: both the resistivity and the viscosity of the PVP based electrolyte are about 1300 higher than the corresponding values in the absence of PVP.

g. Operation of completed electrochromic device

Figure 8A:
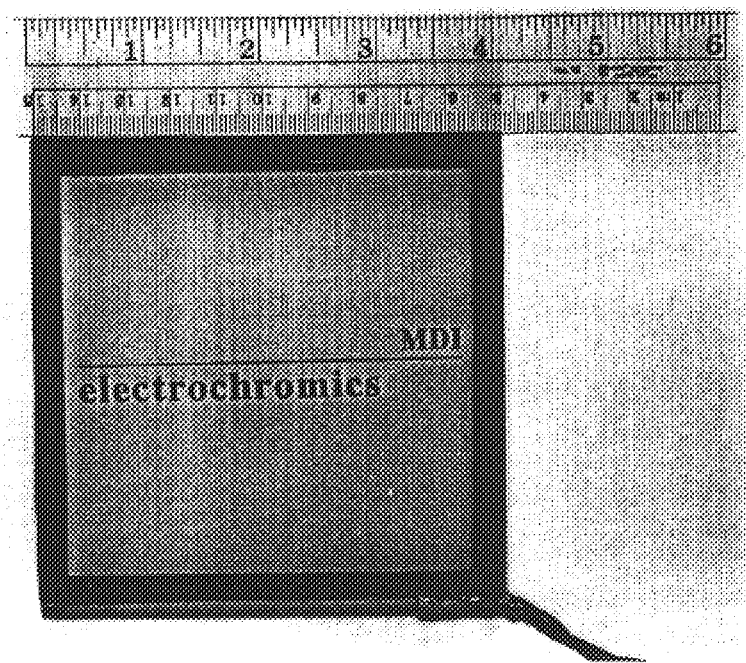
FIGS. 8A and 8B are photographs of a transmissive electrochromic device based upon PP-PB composite, p(BPQ$^{2+}$), and PVP,K$_+$ aq. electrolyte. $\Gamma_{PP\text{-}PB}$=6.09 mC/cm$^2$, and $\Gamma_{p\ (BPQ^{2+})}$=1.64 mC/cm$^2$.
Figure 8B:
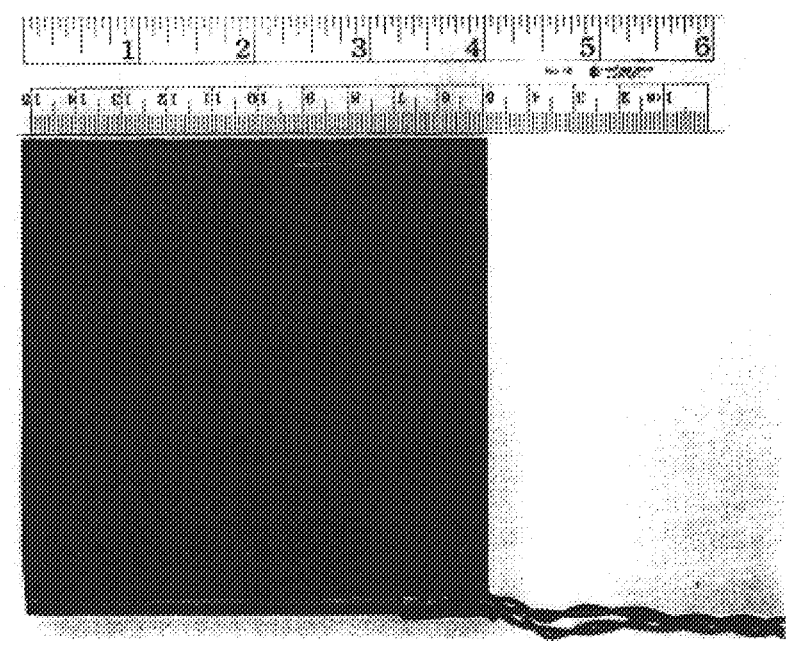
Figure 9:
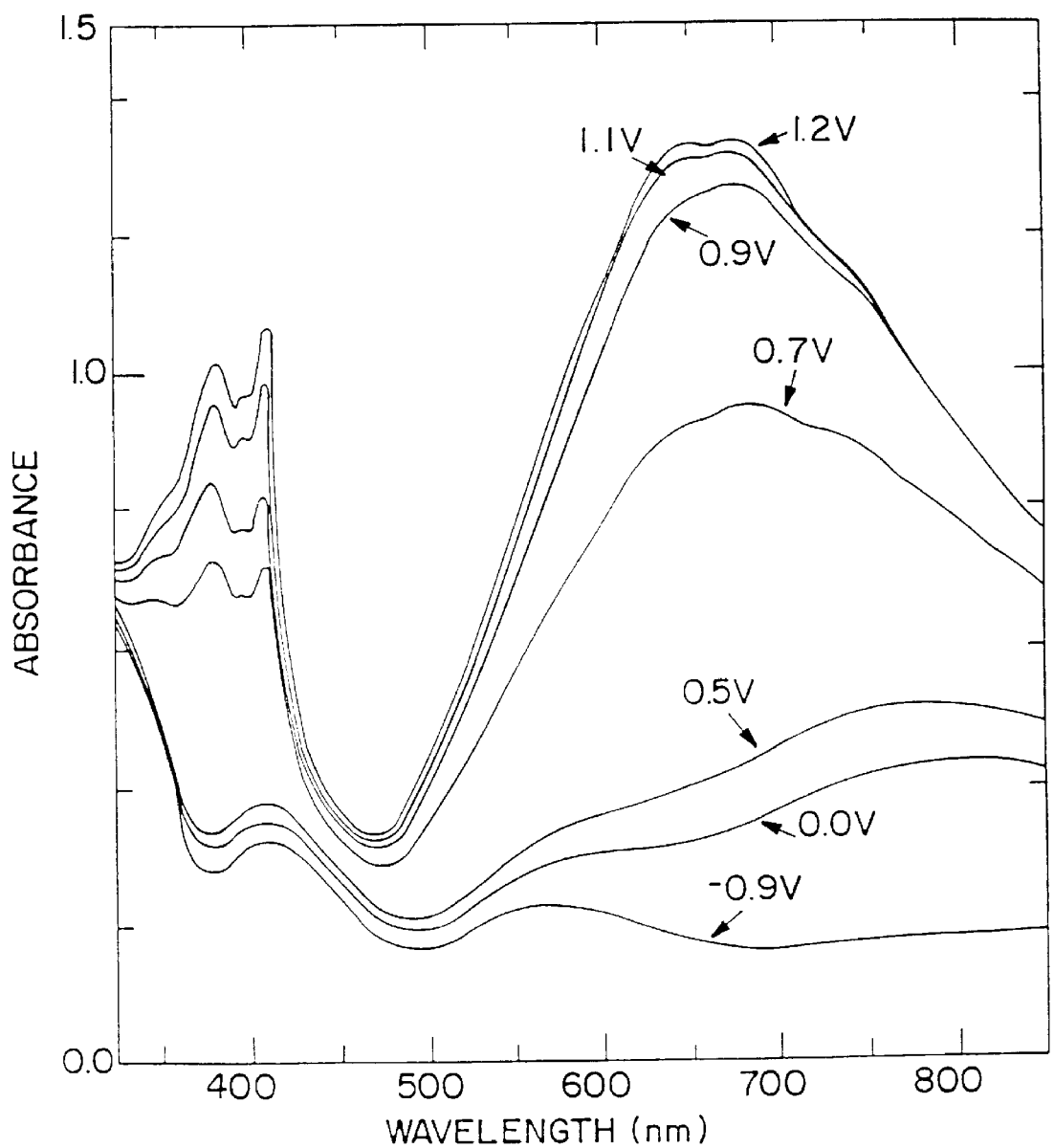
FIG. 9 is the spectroelectrochemical characterization of the PP-PB//aq.K$_2$SO$_4$.PVP//p(BPQ$^{2+}$) based complementary transmissive electrochromic device shown in FIG. 8. Positive voltages correspond to forward biasing (the positive lead on the PP-PB electrode, and the negative lead on the p(BPQ$^{2+}$)) electrode. Negative voltages correspond to reverse biasing.

Application of a 0.8–0.9 V bias across the two electrodes, turns the device from colorless to blue. FIG. 8 is a photograph of such a device. FIG. 9 in turn demonstrates the absorption spectrum of the device of FIG. 8 as a function of the voltage applied across the two electrodes. It is observed that both electrodes get colored simultaneously, which is to be expected from a complementary system: the absorption spectrum of the entire device consists of the superimposed absorptions of the two individual materials.

The voltage required for the coloration corresponds approximately to the potential difference (vs. Ag/AgCl) between the oxidation wave of PP-PB, and of the reduction wave of $p(BPQ^{2+})$, as discussed previously. However, the maximum absorbance of the device is only ~1.35, while the absorbance expected if the coverage of both electrodes in relation to the data of FIG. 6 is considered, should be higher, around 2.0. Since there is a 3.7 times excess of redox equivalents of PP-PB over $p(BPQ^{2+})$, the PP-PB composite is only partially oxidized and colored when the complementary device is powered with voltage capable of carrying $p(BPQ^{2+})$ only through its first reduction wave.

Nevertheless, devices such as those shown in FIG. 8 and characterized in FIG. 9 still absorb ~95% of the light in the region of maximum absorbance. The fact that PP-PB is in redox-equivalent excess over $p(BPQ^{2+})$ ensures that all of $p(BPQ^{2+})$ goes to its singly reduced state. This is desirable because $p(BPQ^{2+})$ films absorb stronger than PP-PB as discussed above. If the opposite material balance were true, then either $p(BPQ^{2+})$ would not colorize fully, or if it were forced to, some oxidative decomposition of the electrolyte would have to take place on the PP-PB electrode in order to compensate for the required charge.

Figure 10B:
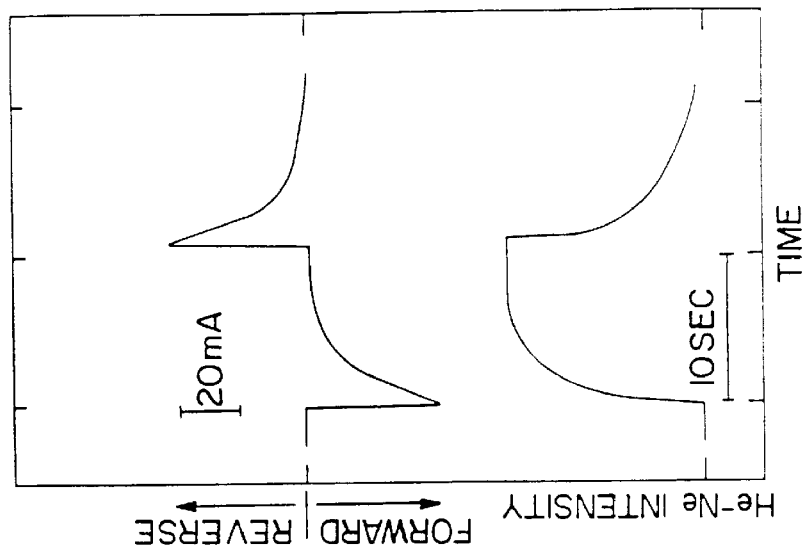
FIGS. 10A and 10B represent the switching speed determination of a transmissive (both electrodes of ITO), and of a reflective (one Pt, one ITO electrode) electrochromic device. Both devices were 4"×4"×1.32".
Figure 10A:
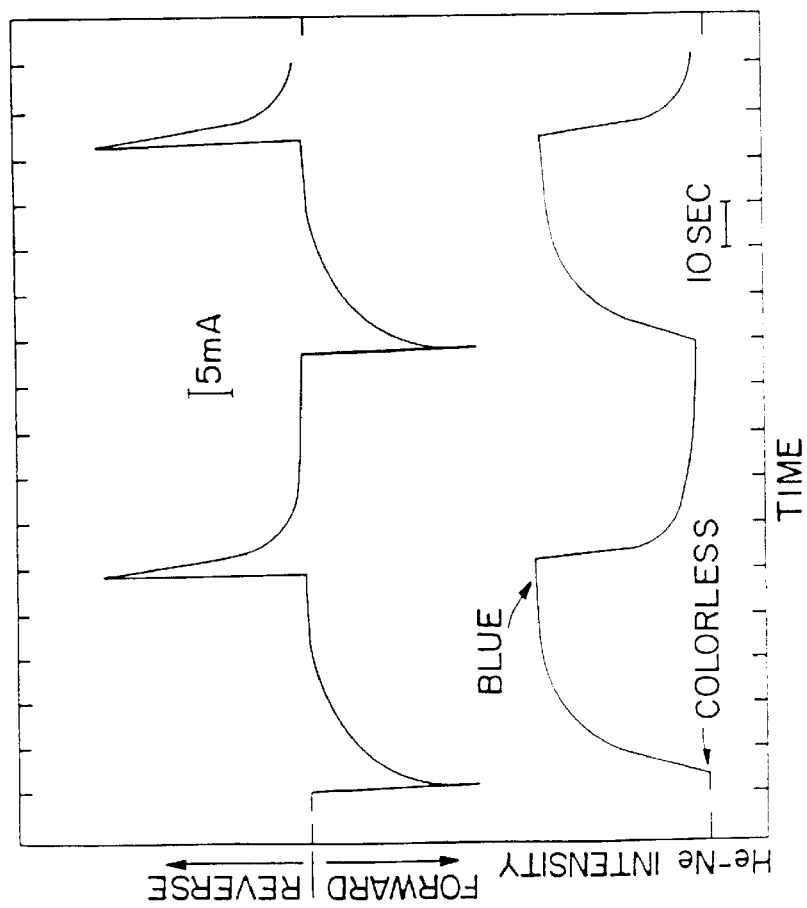

FIG. 10 demonstrates typical data useful for the determination of the switching speed of the inventive electrochromic devices. Clearly, a reflective device (one electrode is Pt) switches faster than a transparent device (both electrodes are ITO). The data of FIG. 10 suggest that a very important switching speed limiting factor is the resistance of the electrodes. In fact, if the electrodes were not resistive at all, a 4"×4"×1/32" device should charge with τ=RC≦0.1 sec. This value is calculated using 20 $\mu F/cm^2$ as a typical double layer capacitance, and the resistivity of the electrolyte which was found ~36×10³ Ω-cm. Moreover, using the Einstein-Smolukowski relationship, (film thickness)=$[2D_{CT}t]^{1/2}$, it is calculated that a ~0.25 μm thick film of the slower electrochromic material, which is the PP-PB composite, should charge at a time, t, of approximately 2.8 sec. At this point, the only other switching speed limiting factor that makes the switching speed of the devices longer than 2.8 sec is the electrode resistance which increases the RC time constant of the cell. Nevertheless, the switching speed demonstrated is still faster than that of even smaller devices reported in the literature, which were based on surface confined metal oxides, or solution type electrochromic materials.

B. Preparation and Characterization of a New Electrochromic Polymer/Redox Conductive Oxide Layered Material a. Reductively colored $p(BPQ^{2+})/WO_3$ bilayer electrochromic material In an improved form of the present invention, a novel bilayered electrochromic material has been developed. This new bilayered material employs a metallic oxide which is conductive in at least one of its redox states and an electrodeposited coating of an electrochromic polymer. Depending upon the metallic oxide and polymer selected, this new bilayered material may be employed in an electrochromic device on either the reductively or oxidatively colored side.

As an illustrative example, in one embodiment of the invention, used for the reductively colored side, the metallic oxide is $WO_3$, and the polymer electrodeposited on it is $p(BPQ^{2+})$.

As discussed above, $WO_3$ films on electrodes form the so called tungsten bronzes which are blue and electrically conducting:

This reduction depends on the availability and uptake of both M⁺ and e⁻: in aqueous electrolytes and at a fixed pH, $WO_3$ in the reduced state behaves as an electronic conductor below a certain potential threshold.

It is disclosed in the present invention that $WO_3$ can be utilized as an effective electrode to electrochemically deposit a polymer derived from N,N'-bis[p-(trimethoxysilyl)benzyl]-4,4'-bipyridinium dichloride ($BPQ^{2+}$.2Cl)

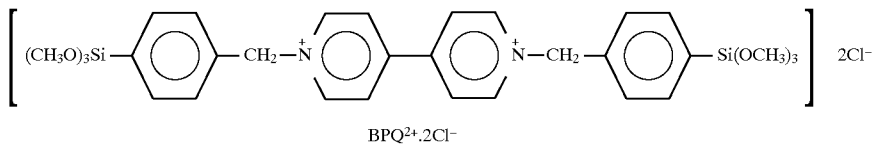

BPQ²⁺·2Cl⁻

The new layered electrochromic material was found to be more durable, and displayed an enhanced two-step electrochromic effect compared to underivatized $WO_3$; both these factors are important in commercial applications.

C. Example 2 p($BPQ^{2+}$)/$WO_3$ layered electrochromic material for the reductively colored side ITO glass (maximum sheet resistance 12 Ω/sq.) was purchased from Donnelly, Corp., Holland, Mich., and was cleaned by successive sonications in MICRO Cleaning Solution, deionized water, and ethanol. A final cleaning of ITO glass was carried out by oxygen plasma just prior to deposition of $WO_3$: a $WO_3$ target was rf sputtered in Ar/$O_2$ plasma according to literature procedures.

N,N'-bis[p-(trimethoxysilyl)benzyl]-4,4'-bipyridinium dichloride ($BPQ^{2+}$·2Cl⁻) was also prepared according to well known procedures.

Next, a polymer of $BPQ^{2+}$, called p($BPQ^{2+}$), was deposited on top of a $WO_3$ electrode using the novel neutral pH electrodeposition method described above in Example 1. This is especially advantageous in this case, since sputtered $WO_3$, while fairly stable upon electrochemical cycling at pHs that vary from very acidic to mildly basic, cannot withstand prolonged exposure to the pH~10 solutions conventionally used for deposition of p($BPQ^{2+}$). In this case, ~3 mM solution of $BPQ^{2+}$ in 0.5M $K_2SO_4$ adjusted at pH~7 with $K_2HPO_4$ was used.

Figure 11:
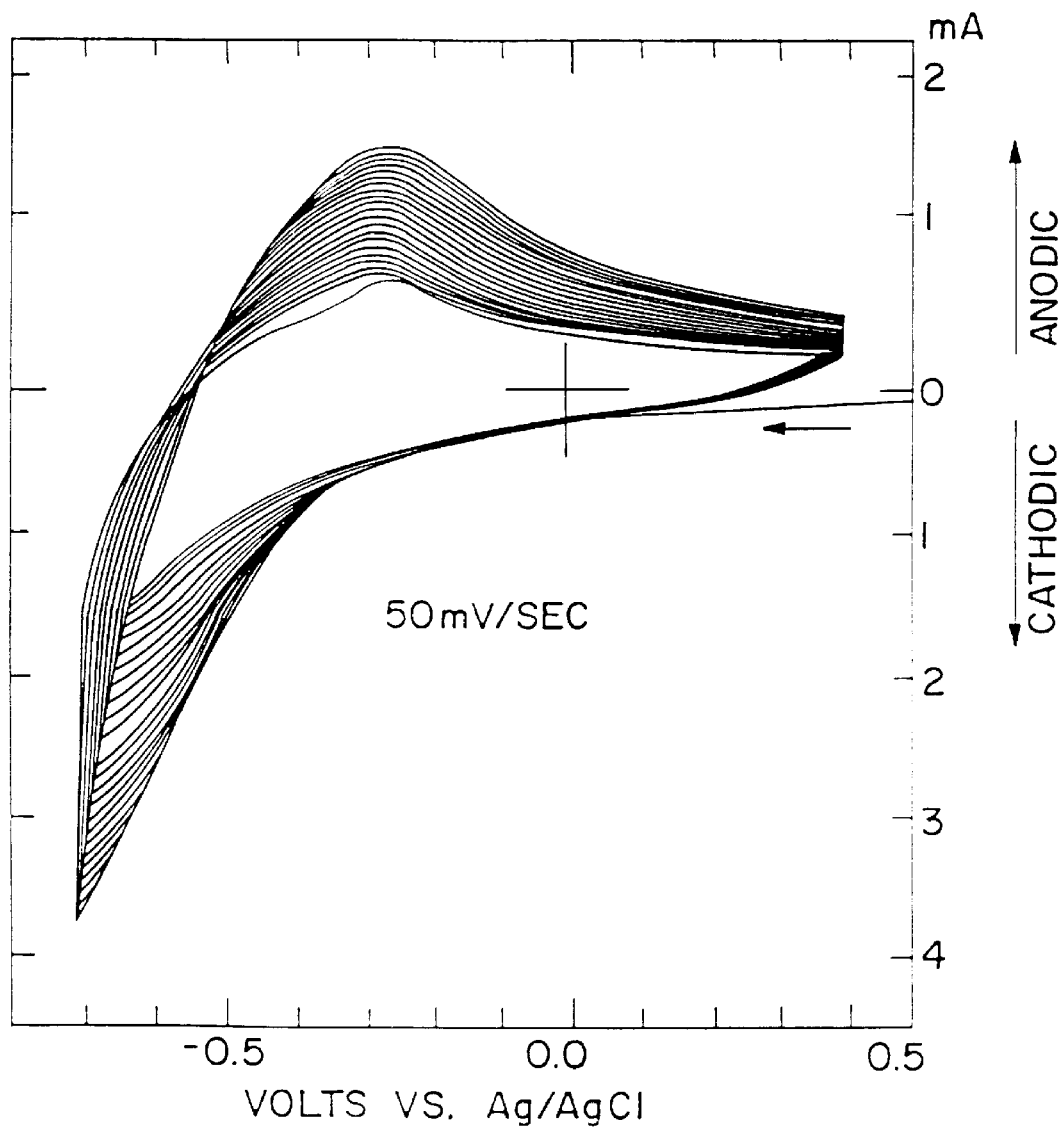
FIG. 11 represents the typical CVs for electrodeposition of p(BPQ$^{2+}$) on a WO$_3$ electrode (7.2 cm$^2$); [BPQ$^{2+}$]≈5 mM in 0.5M aq. K$_2$SO$_4$ at pH≈7.

CV experiments were carried out by either a PINE Instruments bipotentiostat, or an EG&G PAR 273 potentiostat. Film thickness was determined with a Sloan Dektak II profilometer. Spectroelectrochemical experiments were done in an H-cell, degassed with Ar and sealed. Absorption spectra were taken by a PC controlled Perkin Elmer Lambda-6 spectrophotometer. X-ray element analysis was accomplished by a Physical Electronics model 548 Auger/ESCA spectrometer, with a MgKα source at 1,254 eV, and a Perkin Elmer cylindrical mirror analyzer. FIG. 11 shows the CVs of p($BPQ^{2+}$) deposition on $WO_3$/ITO surface.

Figure 12:
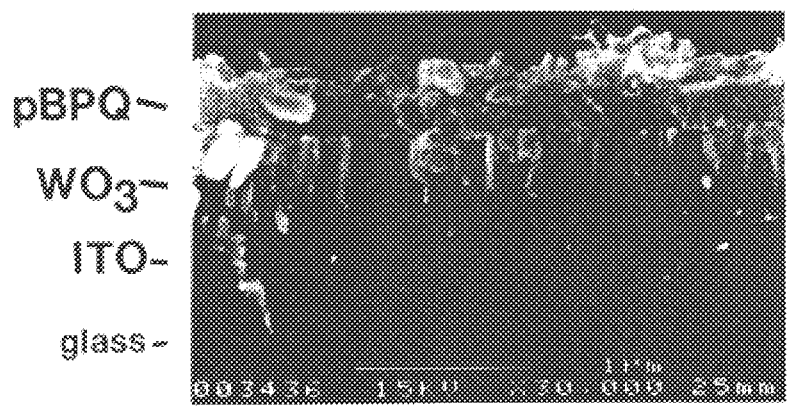
FIG. 12 depicts and SEM picture of a p(BPQ$^{2+}$)/WO$_3$ bilayer film on ITO glass.

FIG. 12 depicts and SEM picture of a p($BPQ^{2+}$)/$WO_3$ bilayer film on ITO glass. As can be seen, the p($BPQ^{2+}$) is deposited in a thick, consistent layer on top of the $WO_3$.

Figure 13A:
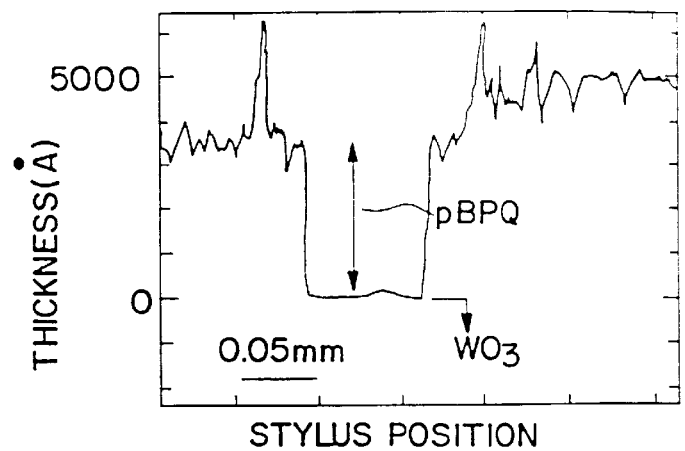
FIG. 13A represents the depth profile of a p(BPQ$^{2+}$)/WO$_3$ bilayer film.
Figure 13B:
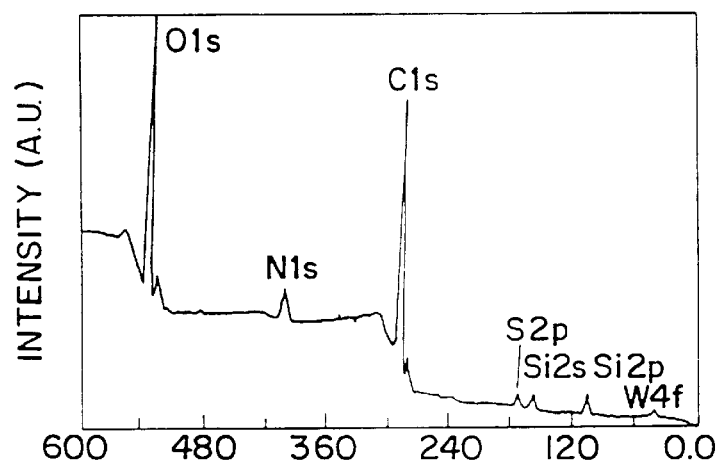
FIG. 13B represents the XPS analysis of the surface of a p(BPQ$^{2+}$)/WO$_3$ electrode; $\Gamma_{p\ (BPQ^{2+})/WO3}$=11.6 mC/cm$^2$ (5 mV/sec).
Figure 13C:
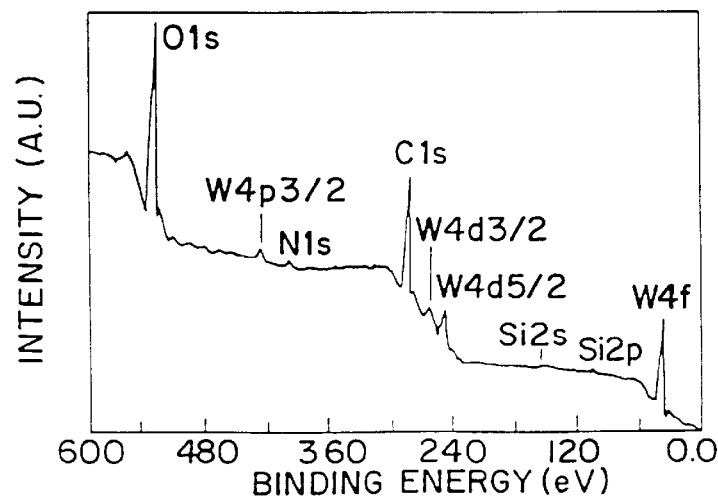
FIG. 13C represents the XPS of a WO$_3$ film after it was dipped without potential control in a p(BPQ$^{2+}$) deposition solution.

Electrochemical experiments were carried out which verified that the $WO_3$ films are pinhole free, and FIG. 13A demonstrates a typical ~3,500 Å layer of p($BPQ^{2+}$) deposited on top of $WO_3$. In turn, FIG. 13B shows the XPS analysis of the surface of the same layered electrode, and verifies that elements that correspond to p[($BPQ^{2+}$).$SO_4^{2-}$] can be seen exclusively. FIG. 13C shows the XPS analysis of a $WO_3$ film which was immersed in the p($BPQ^{2+}$) deposition solution, but without any application of potential. This $WO_3$ film belongs to the same batch as the $WO_3$ film used in the experiments of FIGS. 13A and 13B. It is interesting to note that simple immersion of a $WO_3$ electrode in a p($BPQ^{2+}$) plating solution causes some p($BPQ^{2+}$) to be adsorbed on the surface of $WO_3$. However, a thick and controlled layer of p($BPQ^{2+}$) in the range of about 2000 Angstroms or more, which is stable and strongly adhered, can be deposited only by electrochemical means.

Figure 14:
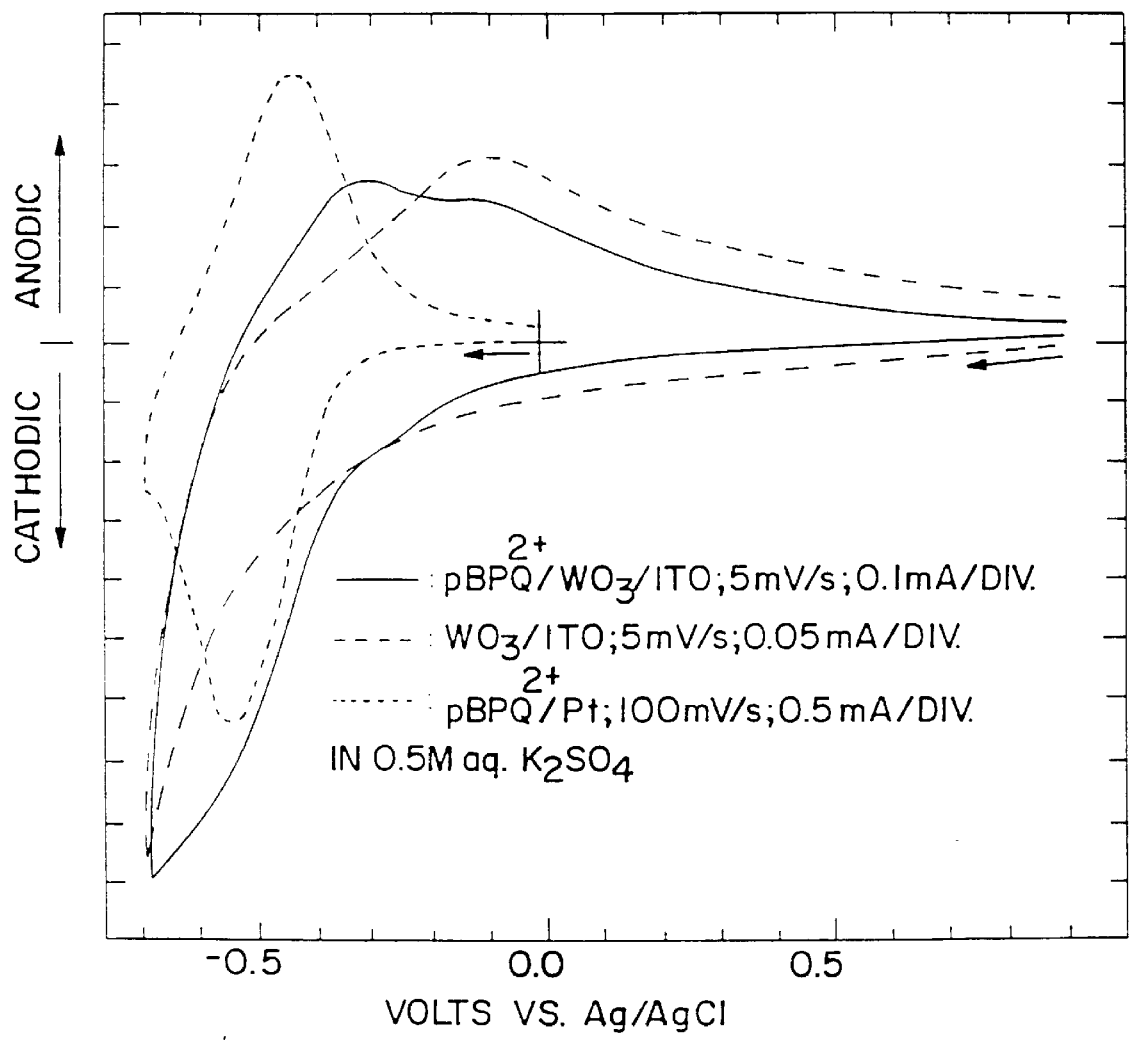
FIG. 14 represents the cyclic voltammetry of a p(BPQ$^{2+}$)/WO$_3$ electrode ($\Gamma_{p\ (BPQ^{2+})/WO3}$=11.6 mC/cm$^2$), a WO$_3$ electrode ($\Gamma_{WO3}$=6.3 mC/cm$^2$), and of a p(BPQ$^{2+}$) electrode $\Gamma_{p(BPQ^{2+})}$=0.5 mC/cm$^2$).

The electrochemical characterization of a p($BPQ^{2+}$)/$WO_3$ film in comparison to $WO_3$ film alone, and p($BPQ^{2+}$) alone, is shown in FIG. 14. The CV of the p($BPQ^{2+}$)/$WO_3$ layered material shows the features of both p($BPQ^{2+}$), and $WO_3$. Upon repeated potential cycling, the charge under the CV of p($BPQ^{2+}$)/$WO_3$ electrode is found to decay much slower than the charge under the CV of the electrode which has only $WO_3$ on it.

Figure 15A:
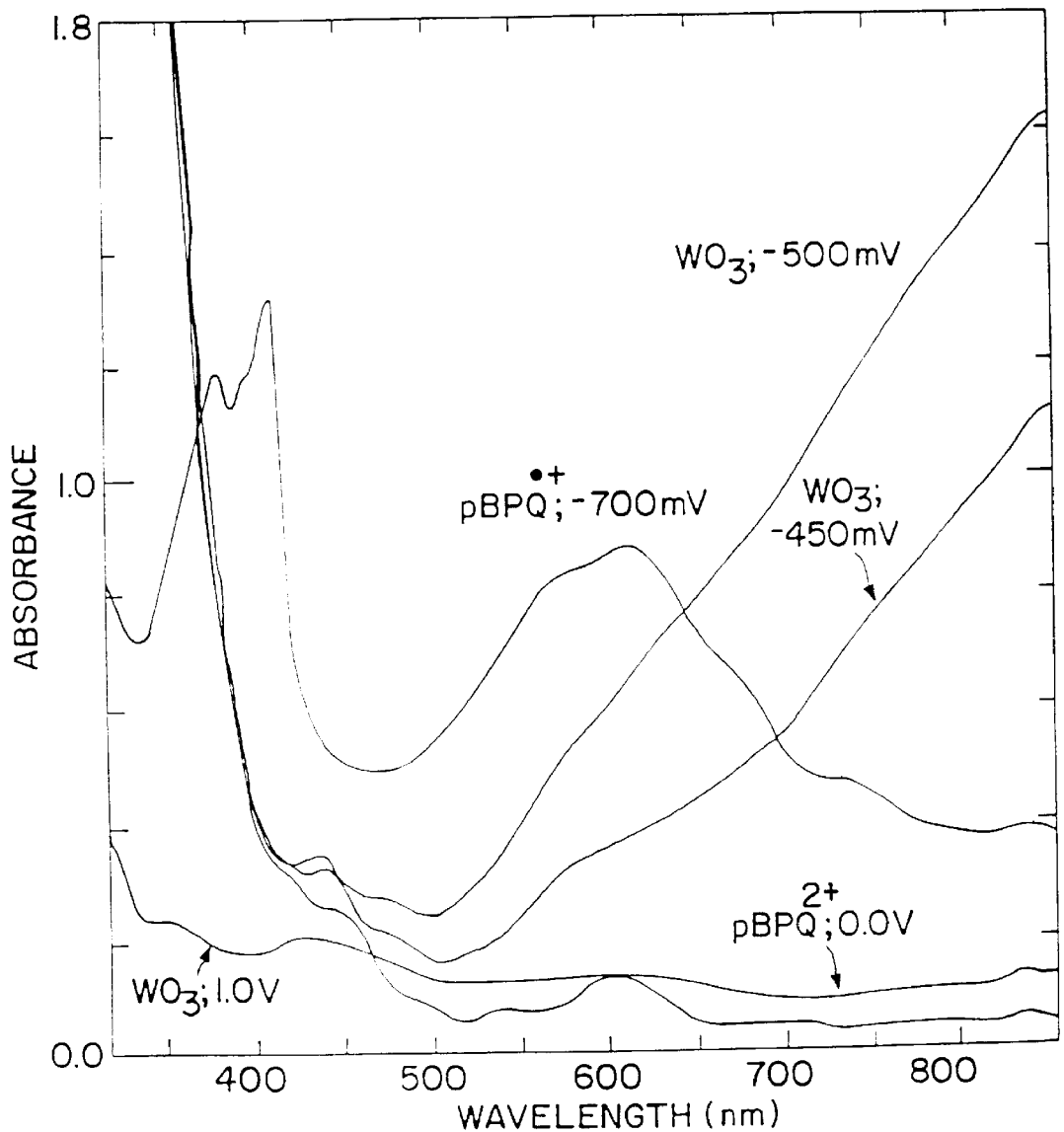
FIG. 15 shows the absorption spectra of p(BPQ$^{2+}$) and WO$_3$ in their oxidized and reduced forms, (FIG. 15A), as well as the bilayer material (FIG. 15B), in 0.5M aq. K$_2$SO$_4$ solution. Voltages shown are vs. the Ag/AgCl reference electrode.
Figure 15B:
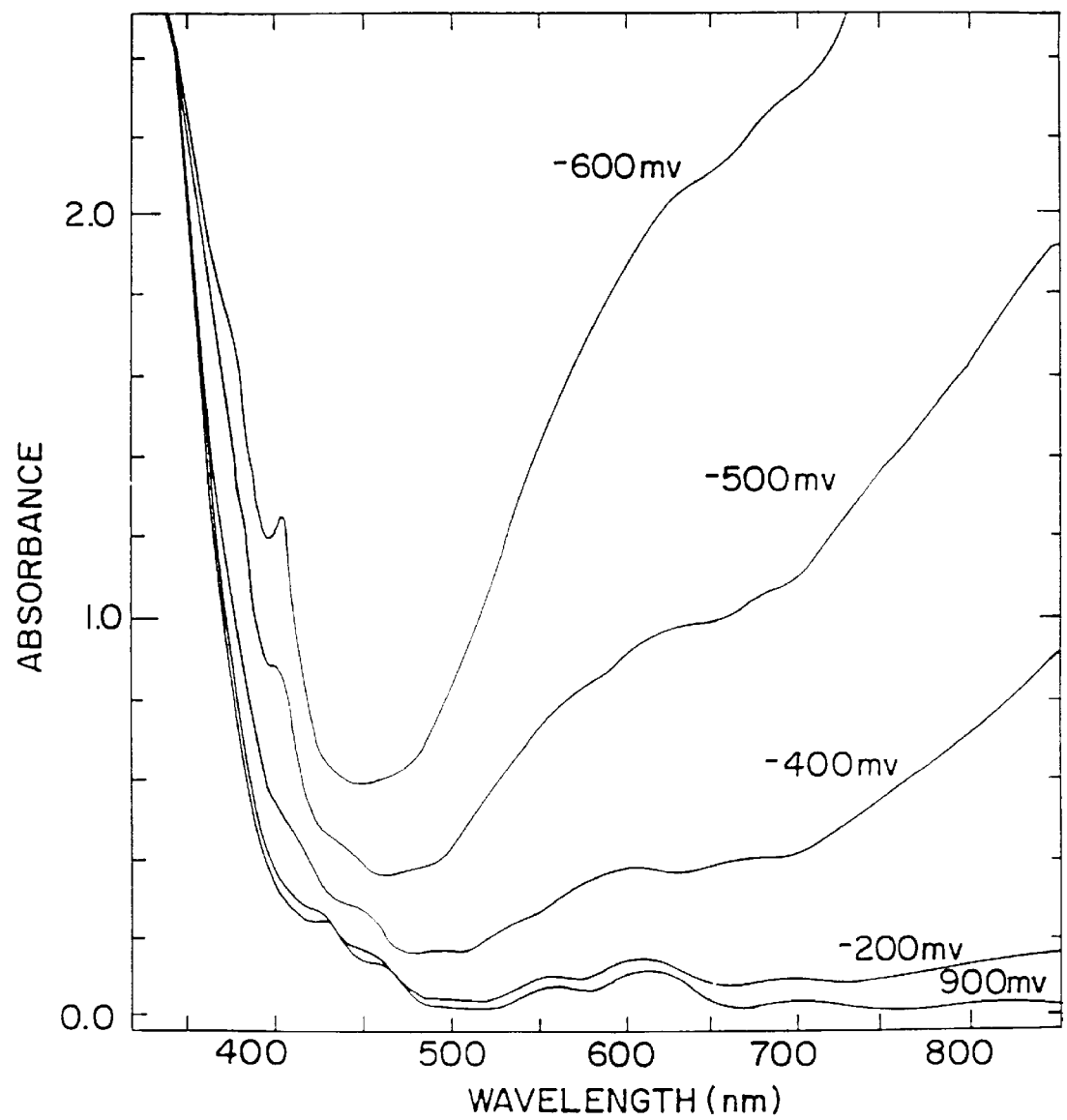

FIG. 15 shows the absorption spectra of p($BPQ^{2+}$) and $WO_3$ in their oxidized and reduced forms (FIG. 15A), as well as the bilayer material (FIG. 15B). One can see that the bilayer structure shows an absorption spectrum which is basically a sum of the two independent electrochromic materials. At ~−600 mV vs. Ag/AgCl, the p($BPQ^{2+}$)/$WO_3$ film shows a deep, aesthetically pleasing blue coloration which has important applications into electrochromic devices.

Other redox conducting oxides could be used, in the same manner as $WO_3$, as electrodes to plate other redox, or redox conducting polymers. For example, it is disclosed in the present invention that p($BPQ^{2+}$) can be successfully electroplated on $Nb_2O_5$ films as well. Other reductively coloring and conducting metallic oxides upon which viologen or other viologen analogues can be electrodeposited, can also be used to form the layered material of the present invention. Examples of these are, for example: $MoO_3$, $V_2O_5$, $TiO_2$, $ReO_3$ and mixtures of them.

D. Oxidatively colored metallic oxide/polymer bilayer material

It is also possible to use the layered composite materials of metal oxides with conducting or redox polymers deposited on them of the present invention on the oxidatively coloring side. These include iridium oxide, rhodium oxide, nickel oxide, nickel hydroxide, cobalt oxide, ruthenium oxide, etc. In this case, conducting polymers like polyaniline, polythiophenes, polypyrrols, polyfurams etc. can also be electroplated on the oxidatively coloring metallic oxide for their protection, to form the metallic oxide/polymer layered material of the present invention. If these conducting polymer films are also loaded with prussian blue, in a similar manner as for the PP-PB composite material described above, enhanced electrochromism will be obtained.

E. Applications for the bilayered material

Apart from the obvious applications to electrochromics, other possible applications of this kind of bilayer materials might be in sensors. For instance, methylviologen is a well known redox mediator. It is believed that p($BPQ^{2+}$) can mediate the redox reaction between the conducting and insulating states of $WO_3$, and certain analytes.

In electrochromic systems, absorbance more uniformly distributed through the visible spectrum is desirable. Accordingly, polymeric electrochromic materials which are spectroscopically complementary as well are also contemplated within the scope of the present invention.

In addition, the switching of PP-PB composite is expected to be faster in certain non aqueous electrolytes (compare for instance the insets in FIGS. 4A and 4B). Accordingly, PP-PB together with p($BPQ^{2+}$) and a non-aqueous electrolyte are ideally suited for high resolution displays, where the refresh rate dictates switching speed requirements.

The foregoing has described a complementary electrochromic system based on electrochromic polymers, and a viscous aqueous electrolyte at pH~7. The durability of the materials, together with the color intensity, power requirements and switching speed of the assembled devices are very satisfactory for several practical applications.

F. Photovoltaic cell powered and self-modulating electrochromic devices

It has been discovered that the electrochromic devices of the present invention may be powered using a photovoltaic cell. This configuration is depicted in FIGS. 16A, 16B, 17A, 17B, 18A, and 18B.

A photovoltaic cell is a p-n junction which, when illuminated, generates power (up to 0.5 V for a silicon cell). Two silicon cells 205 in series generate approximately 1.0 V, which is exactly what is required to colorize a p($BPQ^{2+}$)/PP-PB based device.

Figure 16A:
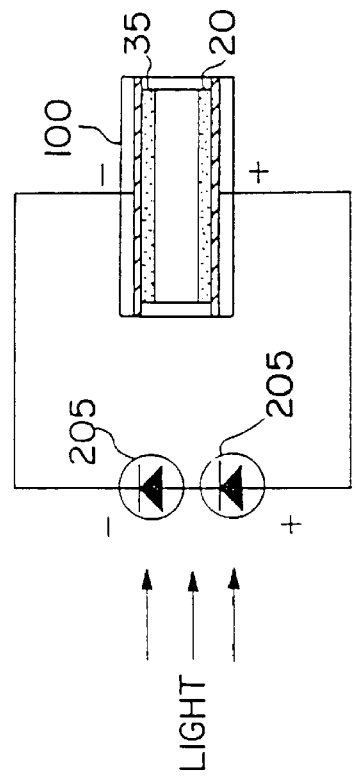
FIGS. 16A and 16B are schematic depictions of a photovoltaic (solar) cell powered electrochromic device with light incident on the photovoltaic cell.
Figure 16B:
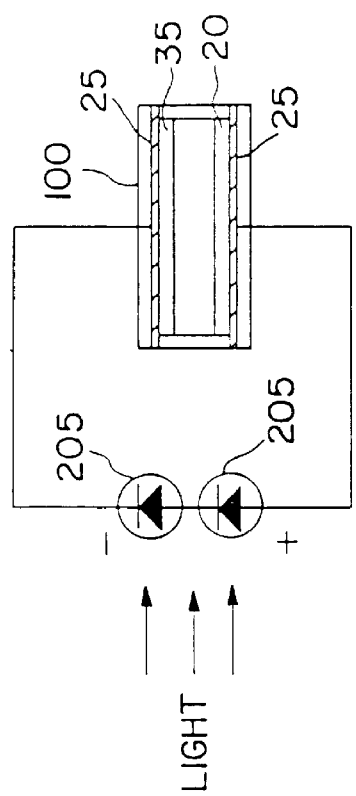

In FIG. 16A, the electrochromic device 100 is in the decolorized state and light has just begun to strike the photovoltaic cells 205. A short time later, the electrochromic device is charged, and both of the electrochromic materials are in the colored state, as depicted in FIG. 16B.

Figure 17A:
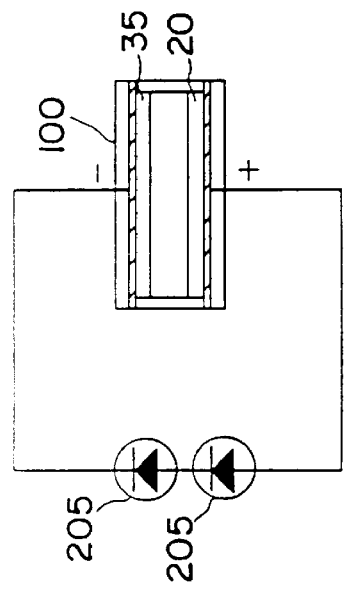
FIGS. 17A and 17B are schematic depictions of a photovoltaic cell powered electrochromic device with no light incident on the photovoltaic cell operating as a forward biased p-n diode in the absence of illumination.
Figure 17B:
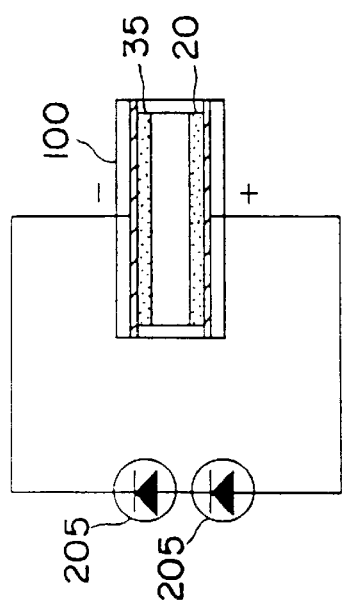

When the illumination is interrupted, the two photovoltaic cells 205 operate as regular diodes which find themselves forward biased. Thus, the electrochromic device is essentially "shorted". The start of the no-illumination condition is depicted in FIG. 17A. A short time later, the electrochromic device 100 gets "discharged" and decolorized by reverse current flow through the photovoltaic cells 205, as depicted in FIG. 17B.

Figure 18A:
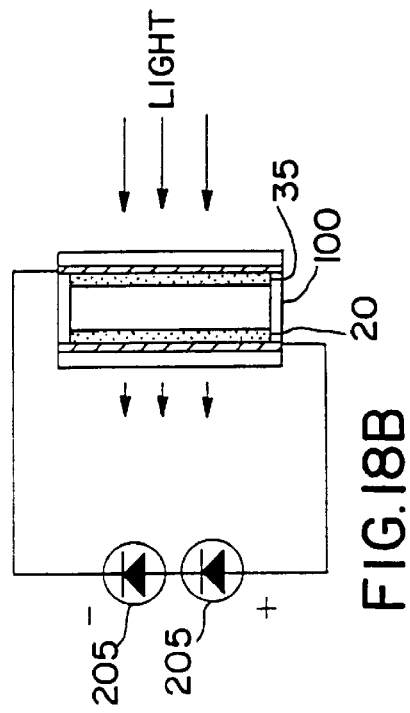
FIGS. 18A and 18B depict a self-adjusting arrangement of the photovoltaic cell and electrochromic device where the photovoltaic cell is behind the electrochromic device.
Figure 18B:
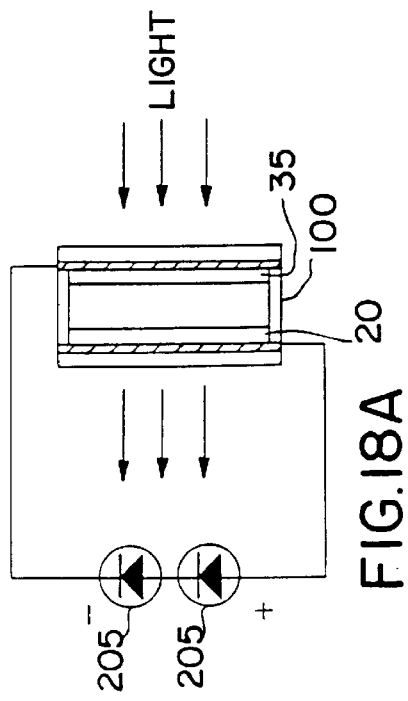

The photovoltaic cells 205 are preferably placed behind the electrochromic device 100 (i.e. arranged to be on the opposite side of the panel from the expected source of light and to face the expected source of light through an at least partially transmissive portion of the electrochromic device), as depicted in FIGS. 18A and 18B. In this way, increased electrical output from the photovoltaic cells 205 tends to increase the degree of coloration of said electrochromic device. Since the photovoltaic cells 205 are behind the electrochromic device 100, any light striking the cell must pass through the electrochromic material. As the degree of colorization of said electrochromic device increases, the intensity of light on the photovoltaic cells 205 decreases, and the output from the photovoltaic cells decreases as well, tending to decrease the degree of colorization of the electrochromic material. FIG. 18A depicts the situation where the light has just begun to strike the photovoltaic cells, and while the electrochromic device is still substantially not colored. As light causes the photovoltaic cells 205 to output current, the colorization increases. This causes the intensity of the light passing through the electrochromic material to decrease until the degree of colorization is automatically balanced by the charge provided by the illuminated solar cells. In this way, the electrochromic cell powered by a photovoltaic cell is not only self-powering, but also automatically self-adjusting to the ambient light conditions as the degree of colorization is controlled by a simply feedback process, without the need for complex electronic controls. FIG. 18B depicts the electrochromic device after it has reached an equilibrium state of partial coloration, dependent upon the intensity of the light. Such a self powered and self modulating electochromic device can be employed on windows, skylights, sunglasses, automotive windows and windshields, automotive mirrors and any other application where automatic modulation of degree of the colorization of the electrochromic device is desired.

G. Uses for electrochromic devices in accordance with the present invention

The novel electrode surface confined polymer-based electrochromic devices of the present invention are highly beneficial in a variety of practical applications where light modulation is desirable. These include, for example, alpha-numeric displays for clocks, watches, computer monitors, outdoor advertisement and announcement boards, periodically variable information signs (such as, for example, in a train station) and other types of displays. Practical use in such display applications is aided greatly by the greatly improved cycling lifetime of an electrochromic device in accordance with the present invention. In addition, an important application for the electrochromic devices of the present invention in light modulation in, for example, mirrors of variable reflectance (as are used in some automotive rearview mirrors), sunglasses, automotive windshields, sunroofs, building windows and the like. Use in building windows to reduce the need for air conditioning by reducing the amount of sunlight entering windows (by selective coloring of the electrochromic material) is an important application, since a large portion of the energy used for air conditioning is used to counteract the heat gain from sunlight entering windows.

Although a detailed description of certain embodiments of the present invention has been provided, it will be apparent to persons of ordinary skill in the art that various changes and modifications may be made within the scope and spirit of the present invention to solely the embodiments shown and described. Rather, the scope of the invention is to be determined with reference to the appended claims.

We claim:

1. An electrochromic device comprising at least one substrate having a layer of an electrochromic metallic oxide thereon, and a layer of strongly adhered, electrode surface confined polymeric electrochromic material having a thickness of at least 2,000 Angstroms.

2. The device defined in claim 1, wherein said polymeric electrochromic material is a heteroaromatic substance containing at least one quaternized nitrogen atom group.

3. The device of claim 2, wherein said heteroaromatic substance is taken from the group of 4,4'-bipyridine, 2,2'-bipyridine, 4,9-diazafluorene and 3,7-diazafluorene.

4. The device of claim 2, wherein said heteroaromatic substance is a fused aromatic ring polyaromatic substance.

5. The device defined in claim 4, wherein said fused aromatic ring polyaromatic substance is taken from the group of 1,10-phenanthroline, 1,7-phenanthroline, 4,7-phenanthroline, 3,8-phenanthroline, 2,7-diazapyrene, and 2,9-diazaperopyrene.

6. The device of claim 1, wherein said confined polymeric electrochromic material includes at least one cross-linker derived from a trialkoxysilyl group.

7. The device of claim 6, wherein the confined polymeric electrochromic material is derived from N, N'-bis[p-(trimethoxysilyl) benzyl]-4,4'-bipyridinium dichloride, N, N'-bis [3-(trimethoxysilyl)propyl]-4,4'-bipyridinium dibromide, N, N'-bis[p-(trimethoxysilyl) benzyl]-2,7-diazapyrenium dichloride or N, N'-bis [3-(trimethoxysilyl) propyl]-2,7-diazapyrenium dibromide.

8. The device of claim 7, wherein said electrochromic metallic oxide is able to change from a substantially colorless state to a colored stated upon reduction and includes as a constituent a metal taken from the group of tungsten, molybdenum, niobium, vanadium and titanium.

9. The device of claim 8, wherein said electrochromic metallic oxide is tungsten trioxide.

10. A method for surface confining electrochromic materials in multiple layers onto a conductive substrate, comprising the steps of depositing a layer of an electrochromic metallic oxide which is conductive in at least one of its redox states onto said conductive substrate, and then electrodepositing a polymeric electrochromic material onto said metallic oxide layer in an ionically conductive solution.

11. The method of claim 10, wherein said electrochromic metallic oxide is deposited by sputtering.

12. The method of claim 10, wherein said electrochromic metallic oxide is able to change from a substantially colorless state to a colored state upon reduction and includes as a constituent a metal taken from the group of tungsten, molybdenum, niobium, vanadium and titanium.

13. The method of claim 12, wherein said electrochromic metallic oxide is tungsten trioxide.

14. The method of claim 10, wherein said polymeric electrochromic material is a heteroaromatic substance containing at least one quaternized nitrogen atom group.

15. The method of claim 14, wherein said heteroaromatic substance is taken from the group of 4,4'-bipyridine, 2,2'-bipyridine, 4,9-diazafluorene and 3,7-diazafluorene.

16. The method of claim 14, wherein said heteroaromatic substance is a fused aromatic ring polyaromatic substance.

17. The method of claim 16, wherein said fused aromatic ring polyaromatic substance is taken from the group of 1,10-phenanthroline, 1,7-phenanthroline, 4,7-phenanthroline, 3,8-phenanthroline, 2,7-diazapyrene, and 2,9-diazaperopyrene.

18. The method of claim 14 wherein said at least one quaternized nitrogen atom group includes at least one cross-linker derived from a trialkoxysilyl group.

19. The method of claim 18, wherein the polymeric electrochromic material is derived from N, N'-bis[p-(trimethoxysilyl) benzyl]-4,4'-bipyridinium dichloride, N, N'-bis [3-(trimethoxysilyl)propyl]-4,4'-bipyridinium dibromide, N,N'bis[p-(trimethoxysilyl) benzyl]-2,7-diazapyrenium dichloride or N, N'-bis [3-(trimethoxysilyl) propyl]-2,7-diazapyrenium dibromide.

20. The method of claim 10, wherein the ionically conductive solution is aqueous and adjusted to a pH in the range of about 5–9.

21. The method of claim 10, wherein the ionically conductive solution is an aqueous solution of a salt M, adjusted to a pH in the range of about 7, where M is taken from the group $K_2SO_4$, KCl, NaCl, LiCl, $KH_2PO_4/K_2HPO_4$ buffer, $NaClO_4$, $LiClO_4$, $CF_3SO_2Li$.

22. The method of claim 20 wherein the aqueous solution has a concentration in the range of 0.05 Molal to 1.5 Molar.

* * * * *